(12) United States Patent
Friesen et al.

(10) Patent No.: US 9,214,830 B2
(45) Date of Patent: *Dec. 15, 2015

(54) BATTERY RESETTING PROCESS FOR SCAFFOLD FUEL ELECTRODE

(71) Applicant: Fluidic, Inc., Scottsdale, AZ (US)

(72) Inventors: Cody A. Friesen, Fort McDowell, AZ (US); Ramkumar Krishnan, Scottsdale, AZ (US); Sergey Puzhaev, Scottsdale, AZ (US); Todd Trimble, Phoenix, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,382

(22) Filed: Jul. 1, 2015

(65) Prior Publication Data

US 2015/0311746 A1 Oct. 29, 2015

Related U.S. Application Data

(62) Division of application No. 13/277,031, filed on Oct. 19, 2011, now Pat. No. 9,105,946.

(60) Provisional application No. 61/394,954, filed on Oct. 20, 2010.

(51) Int. Cl.
*H01M 10/42* (2006.01)
*H01M 10/44* (2006.01)
*H01M 12/08* (2006.01)
(Continued)

(52) U.S. Cl.
CPC .............. *H02J 7/045* (2013.01); *H01M 10/42* (2013.01); *H01M 10/44* (2013.01); *H01M 10/46* (2013.01); *H01M 12/08* (2013.01)

(58) Field of Classification Search
None
See application file for complete search history.

(56) References Cited

U.S. PATENT DOCUMENTS 2,083,364 A 6/1937 Cook, Jr.
3,219,486 A 11/1965 Gumucio
(Continued)

FOREIGN PATENT DOCUMENTS

EP 0058090 8/1982
EP 0277937 8/1988
(Continued)

OTHER PUBLICATIONS

Cherepy et al., "A Zinc/Air Fuel Cell for Electric Vehicles," IEEE publication, 1999, pp. 11-13.
(Continued)

*Primary Examiner* — Jonathan Crepeau
(74) *Attorney, Agent, or Firm* — Pillsbury Winthrop Shaw Pittman, LLP

(57) ABSTRACT

An electrochemical cell includes a fuel electrode configured to operate as an anode to oxidize a fuel when connected to a load. The cell also includes an oxidant electrode configured to operate as a cathode to reduce oxygen when connected to the load. The fuel electrode comprises a plurality of scaffolded electrode bodies. The present invention relates to an electrochemical cell system and method of resetting the electrochemical cell by applying a charge (i.e. voltage or current) to the cell to drive oxidation of the fuel, wherein the fuel electrode operates as an anode, and the second cell operates as a cathode, removing uneven distributions of fuel that may cause premature shorting of the electrode bodies to improve capacity, energy stored, and cell efficiency.

10 Claims, 13 Drawing Sheets

(51) Int. Cl.
*H02J 7/04* (2006.01)
*H01M 10/46* (2006.01)

(56) References Cited

U.S. PATENT DOCUMENTS

| | | |
|---|---|---|
| 3,223,611 A | 12/1965 | Wells |
| 3,338,746 A | 8/1967 | Plust |
| 3,483,036 A | 12/1969 | Gregor |
| 3,525,643 A | 8/1970 | Spahrbier |
| 3,532,548 A | 10/1970 | Stachurski |
| 3,615,843 A | 10/1971 | Moran |
| 3,615,844 A | 10/1971 | Spengler |
| 3,650,837 A | 3/1972 | Palmer |
| 3,713,892 A | 1/1973 | Moran |
| 3,716,413 A | 2/1973 | Elsner |
| 3,717,505 A | 2/1973 | Unkle, Jr. |
| 3,728,244 A | 4/1973 | Cooley |
| 3,785,868 A | 1/1974 | Devitt |
| 3,801,376 A | 4/1974 | Lindstrom |
| 3,822,149 A | 7/1974 | Hale |
| 3,840,455 A | 10/1974 | Cooley |
| 3,850,696 A | 11/1974 | Summers |
| 3,886,426 A | 5/1975 | Daggett |
| 3,919,062 A | 11/1975 | Lundquist, Jr. |
| 3,972,727 A | 8/1976 | Cohn |
| 4,039,729 A | 8/1977 | Benczur-Urmossy |
| 4,119,772 A | 10/1978 | Peters |
| 4,201,653 A | 5/1980 | ONeill |
| 4,312,927 A | 1/1982 | Salmon |
| 4,317,863 A | 3/1982 | Struthers |
| 4,340,449 A | 7/1982 | Srinivasan |
| 4,385,101 A | 5/1983 | Catanzarite |
| 4,385,967 A | 5/1983 | Brady |
| 4,447,504 A | 5/1984 | Goebel |
| 4,461,817 A | 7/1984 | Itch |
| 4,521,497 A | 6/1985 | Tamminen |
| 4,581,064 A | 4/1986 | Morrison |
| 4,684,585 A | 8/1987 | Tamminen |
| 4,693,946 A | 9/1987 | Niksa |
| 4,732,823 A | 3/1988 | Ito |
| 4,871,627 A | 10/1989 | Strong |
| 4,894,355 A | 1/1990 | Takeuchi |
| 5,009,755 A | 4/1991 | Shor |
| 5,104,497 A | 4/1992 | Tetzlaff |
| 5,185,218 A | 2/1993 | Brokman |
| 5,190,833 A | 3/1993 | Goldstein |
| 5,318,861 A | 6/1994 | Harats |
| 5,376,471 A | 12/1994 | Hunter |
| 5,415,949 A | 5/1995 | Stone |
| 5,431,823 A | 7/1995 | Gofer |
| 5,434,020 A | 7/1995 | Cooper |
| 5,439,758 A | 8/1995 | Stone |
| 5,458,988 A | 10/1995 | Putt |
| 5,567,540 A | 10/1996 | Stone |
| 5,650,240 A | 7/1997 | Rogers |
| 5,652,068 A | 7/1997 | Shuster |
| 5,733,677 A | 3/1998 | Golovin |
| 5,850,136 A | 12/1998 | Kaneko |
| 5,935,724 A | 8/1999 | Spillman |
| 5,935,728 A | 8/1999 | Spillman |
| 5,938,899 A | 8/1999 | Forand |
| 5,972,531 A | 10/1999 | Kawakami |
| 5,998,967 A | 12/1999 | Umeki |
| 6,014,013 A | 1/2000 | Suppanz |
| 6,025,696 A | 2/2000 | Lenhart |
| 6,027,834 A | 2/2000 | Hayashi |
| 6,034,506 A | 3/2000 | Hall |
| 6,046,514 A | 4/2000 | Rouillard |
| 6,054,840 A | 4/2000 | Nakanishi |
| 6,057,052 A | 5/2000 | Shrim |
| 6,091,230 A | 7/2000 | Winzer |
| 6,121,752 A | 9/2000 | Kitahara |
| 6,127,061 A | 10/2000 | Shun |
| 6,153,328 A | 11/2000 | Colborn |
| 6,162,555 A | 12/2000 | Gutierrez |
| 6,165,638 A | 12/2000 | Spillman |
| 6,207,037 B1 | 3/2001 | Dartnell |
| 6,211,650 B1 | 4/2001 | Mumaw |
| 6,265,846 B1 | 7/2001 | Flechsig |
| 6,271,646 B1 | 8/2001 | Evers |
| 6,277,508 B1 | 8/2001 | Reiser |
| 6,312,846 B1 | 11/2001 | Marsh |
| 6,355,369 B1 | 3/2002 | Iarochenko |
| 6,379,828 B1 | 4/2002 | Worth |
| 6,383,673 B1 | 5/2002 | Faris |
| 6,383,675 B1 | 5/2002 | Zhong |
| 6,410,174 B1 | 6/2002 | Faris |
| 6,458,480 B1 | 10/2002 | Morris |
| 6,465,638 B2 | 10/2002 | Gorman |
| 6,472,093 B2 | 10/2002 | Faris |
| 6,541,941 B2 | 4/2003 | Adams |
| 6,544,678 B2 | 4/2003 | Faris |
| 6,558,830 B2 | 5/2003 | Faris |
| 6,562,494 B1 | 5/2003 | Tsai |
| 6,562,504 B2 | 5/2003 | Faris |
| 6,566,000 B1 | 5/2003 | Iarochenko |
| 6,569,555 B1 | 5/2003 | Faris et al. |
| 6,579,637 B1 | 6/2003 | Savage |
| 6,586,909 B1 | 7/2003 | Trepka |
| 6,641,943 B1 | 11/2003 | Faris |
| 6,646,418 B1 | 11/2003 | Xie |
| 6,649,294 B2 | 11/2003 | Faris |
| 6,653,252 B2 | 11/2003 | Kawahara |
| 6,673,490 B2 | 1/2004 | Miki |
| 6,677,077 B2 | 1/2004 | Spillman |
| 6,706,433 B2 | 3/2004 | Pinto |
| 6,713,206 B2 | 3/2004 | Markoski |
| 6,756,149 B2 | 6/2004 | Knights |
| 6,762,587 B1 | 7/2004 | Barbetta |
| 6,764,588 B2 | 7/2004 | Smedley |
| 6,787,260 B2 | 9/2004 | Smedley |
| 6,802,946 B2 | 10/2004 | Basol |
| 6,811,903 B2 | 11/2004 | Vartak |
| 6,822,423 B2 | 11/2004 | Yau |
| 6,838,203 B2 | 1/2005 | Zheng |
| 6,855,455 B1 | 2/2005 | Berger |
| 6,858,347 B2 | 2/2005 | Tanigawa |
| 6,866,950 B2 | 3/2005 | Connor |
| 6,902,602 B2 | 6/2005 | Keefer |
| 6,911,274 B1 | 6/2005 | Colborn |
| 6,942,105 B2 | 9/2005 | Smedley |
| 6,967,064 B2 | 11/2005 | Haltiner, Jr. |
| 6,986,964 B2 | 1/2006 | Fads |
| 7,020,355 B2 | 3/2006 | Lahann |
| 7,126,310 B1 | 10/2006 | Barron |
| 7,150,933 B1 | 12/2006 | McLean |
| 7,201,857 B2 | 4/2007 | Ovshinsky |
| 7,226,676 B2 | 6/2007 | Fads |
| 7,238,440 B2 | 7/2007 | Damore |
| 7,252,898 B2 | 8/2007 | Markoski |
| 7,270,906 B2 | 9/2007 | Haltiner, Jr. |
| 7,273,541 B2 | 9/2007 | Choban |
| 7,276,309 B2 | 10/2007 | Smedley |
| 7,279,245 B1 | 10/2007 | Clark |
| 7,291,186 B2 | 11/2007 | Zhang |
| 7,303,835 B2 | 12/2007 | Mathias |
| 7,466,104 B2 | 12/2008 | Wang |
| 7,468,221 B2 | 12/2008 | Lafollette |
| 7,482,081 B2 | 1/2009 | Hong |
| 7,488,547 B1 | 2/2009 | Iacovelli |
| 7,535,199 B2 | 5/2009 | Kimura |
| 7,598,706 B2 | 10/2009 | Koski |
| 7,670,575 B2 | 3/2010 | Jarvinen |
| 7,670,705 B2 | 3/2010 | Ueda |
| 7,670,724 B1 | 3/2010 | Chan |
| 7,722,988 B2 | 5/2010 | Weber |
| 8,058,165 B2 | 11/2011 | Kawano |
| 8,492,052 B2 | 7/2013 | Friesen |
| 8,546,028 B2 | 10/2013 | Friesen |
| 8,632,921 B2 | 1/2014 | Friesen |
| 8,658,318 B2 | 2/2014 | Friesen |
| 8,659,268 B2 | 2/2014 | Krishnan |
| 9,105,946 B2 * | 8/2015 | Friesen .................. H01M 2/40 |
| 2001/0007725 A1 | 7/2001 | Faris |

(56) References Cited

U.S. PATENT DOCUMENTS

| | | |
|---|---|---|
| 2002/0015871 A1 | 2/2002 | Tao |
| 2002/0028372 A1 | 3/2002 | Ohlsen |
| 2002/0045075 A1 | 4/2002 | Pinto |
| 2002/0076602 A1 | 6/2002 | Finkelshtain |
| 2002/0098398 A1 | 7/2002 | Chen |
| 2002/0142203 A1 | 10/2002 | Ma |
| 2002/0146600 A1 | 10/2002 | Vartak |
| 2003/0054217 A1 | 3/2003 | Faris |
| 2003/0077501 A1 | 4/2003 | Knights |
| 2003/0099882 A1 | 5/2003 | Hampden-Smith |
| 2003/0134163 A1 | 7/2003 | Markoski |
| 2003/0143446 A1 | 7/2003 | Faris |
| 2003/0165727 A1 | 9/2003 | Priestnall |
| 2003/0190504 A1 | 10/2003 | Fisher |
| 2003/0198862 A1 | 10/2003 | Struthers |
| 2004/0005488 A1 | 1/2004 | Faris et al. |
| 2004/0023112 A1 | 2/2004 | Lin |
| 2004/0053132 A1 | 3/2004 | Smedley |
| 2004/0058203 A1 | 3/2004 | Priestnall |
| 2004/0058217 A1 | 3/2004 | Ohlsen |
| 2004/0058226 A1 | 3/2004 | Lamarre |
| 2004/0121208 A1 | 6/2004 | James |
| 2004/0146764 A1 | 7/2004 | Tsai |
| 2004/0157092 A1 | 8/2004 | Kimberg |
| 2004/0157101 A1 | 8/2004 | Smedley |
| 2004/0175603 A1 | 9/2004 | Yang |
| 2004/0180246 A1 | 9/2004 | Smedley |
| 2004/0185323 A1 | 9/2004 | Fowler |
| 2004/0185328 A1 | 9/2004 | Lin |
| 2004/0225249 A1 | 11/2004 | Leonard |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai |
| 2005/0031911 A1 | 2/2005 | Venkatesan |
| 2005/0084737 A1 | 4/2005 | Wine |
| 2005/0123815 A1 | 6/2005 | Tsai |
| 2005/0170245 A1 | 8/2005 | Vartak |
| 2005/0196656 A1 | 9/2005 | Gomez |
| 2005/0208343 A1 | 9/2005 | Kim |
| 2005/0233191 A1 | 10/2005 | Ushio |
| 2006/0003217 A1 | 1/2006 | Cohen |
| 2006/0024551 A1 | 2/2006 | Smotkin |
| 2006/0038536 A1 | 2/2006 | Lafollette |
| 2006/0076295 A1 | 4/2006 | Leonard |
| 2006/0127731 A1 | 6/2006 | Faris |
| 2006/0210867 A1 | 9/2006 | Kenis |
| 2006/0228622 A1 | 10/2006 | Cohen |
| 2006/0234855 A1 | 10/2006 | Gorte |
| 2006/0269826 A1 | 11/2006 | Katz |
| 2006/0292407 A1 | 12/2006 | Gervasio |
| 2007/0020496 A1 | 1/2007 | Pelton |
| 2007/0048577 A1 | 3/2007 | Ringeisen |
| 2007/0077491 A1 | 4/2007 | Burchardt |
| 2007/0092787 A1 | 4/2007 | WangChen |
| 2007/0120091 A1 | 5/2007 | Ovshinsky |
| 2007/0141415 A1 | 6/2007 | Yang |
| 2007/0141430 A1 | 6/2007 | Huang |
| 2007/0141432 A1 | 6/2007 | Wang |
| 2007/0141440 A1 | 6/2007 | Yang |
| 2007/0141450 A1 | 6/2007 | Yang |
| 2007/0154766 A1 | 7/2007 | Baik |
| 2007/0166602 A1 | 7/2007 | Burchardt |
| 2007/0184314 A1 | 8/2007 | Kagami |
| 2007/0224500 A1 | 9/2007 | White |
| 2007/0234900 A1 | 10/2007 | Soloveichik |
| 2007/0237993 A1 | 10/2007 | Carlsson |
| 2007/0248845 A1 | 10/2007 | Armstrong |
| 2007/0248868 A1 | 10/2007 | Haltiner |
| 2007/0259234 A1 | 11/2007 | Chua |
| 2007/0264550 A1 | 11/2007 | Zhang |
| 2007/0269695 A1 | 11/2007 | Yamazaki |
| 2007/0278107 A1 | 12/2007 | Barnett |
| 2007/0287034 A1 | 12/2007 | Minteer |
| 2008/0008911 A1 | 1/2008 | Stroock |
| 2008/0009780 A1 | 1/2008 | Leonard |
| 2008/0026265 A1 | 1/2008 | Markoski |
| 2008/0032170 A1 | 2/2008 | Wainright |
| 2008/0044721 A1 | 2/2008 | Heller |
| 2008/0145719 A1 | 6/2008 | Yang |
| 2008/0145721 A1 | 6/2008 | Shapiro |
| 2008/0145737 A1 | 6/2008 | Cai |
| 2008/0154101 A1 | 6/2008 | Jain |
| 2008/0231231 A1 | 9/2008 | Hartzog |
| 2008/0241617 A1 | 10/2008 | Sato |
| 2008/0252257 A1 | 10/2008 | Sufrin-Disler |
| 2008/0268341 A1 | 10/2008 | Zhang |
| 2009/0027006 A1 | 1/2009 | Vezzini |
| 2009/0081488 A1 | 3/2009 | Sato |
| 2009/0117429 A1 | 5/2009 | Zillmer |
| 2009/0167242 A1 | 7/2009 | Naganuma |
| 2009/0230921 A1 | 9/2009 | Hsu |
| 2009/0284229 A1 | 11/2009 | Friesen |
| 2009/0286149 A1 | 11/2009 | Ci |
| 2009/0305090 A1 | 12/2009 | Chuang |
| 2010/0062303 A1 | 3/2010 | Bae |
| 2010/0119883 A1 | 5/2010 | Friesen |
| 2010/0119895 A1 | 5/2010 | Friesen |
| 2010/0285375 A1 | 11/2010 | Friesen |
| 2010/0316935 A1 | 12/2010 | Friesen |
| 2011/0039181 A1 | 2/2011 | Friesen |
| 2011/0044528 A1 | 2/2011 | Tsuchiya |
| 2011/0070506 A1 | 3/2011 | Friesen |
| 2011/0086278 A1 | 4/2011 | Friesen |
| 2011/0189551 A1 | 8/2011 | Friesen |
| 2011/0200893 A1 | 8/2011 | Friesen |
| 2011/0250512 A1 | 10/2011 | Friesen |
| 2011/0305959 A1 | 12/2011 | Friesen |
| 2011/0316485 A1 | 12/2011 | Krishnan |
| 2012/0068667 A1 | 3/2012 | Friesen |

FOREIGN PATENT DOCUMENTS

| | | |
|---|---|---|
| EP | 0589144 B1 | 9/1996 |
| GB | 1286173 | 8/1972 |
| WO | 8905528 | 6/1989 |
| WO | 2008058165 | 5/2008 |
| WO | 2009142848 | 11/2009 |
| WO | 2010065890 A1 | 6/2010 |
| WO | 2011035176 | 3/2011 |
| WO | 2011/044528 | 4/2011 |
| WO | 2011/163553 | 12/2011 |
| WO | 2012/012364 | 1/2012 |

OTHER PUBLICATIONS

Cohen et al., "Fabrication and preliminary testing of a planar membraneless microchannel fule cell", J. Power Sources 2005, 139, 96-105.

Ferrigno et al., "Membraneless Vanadium Redox Fuel Cell Using Laminar Flow," J. Am. Chem. Soc. 2002, 124, pp. 12930-12931.

Jayashree et al., "Air-Breathing Laminar Flow-Based Microfluidic Fuel Cell," J. Am. Chem. Soc., 2005, 127, pp. 16758-16759.

Salloum et al., "Sequential flow membraneless microfluidic fuel cell with porous electrodes," Journal of Power Sources 180, 2008, pp. 243-252.

Smedley et al., "A regenerative zinc-air fuel cell," Journal of Power Sources, vol. 165, 2007, pp. 897-904.

Jorne et al. "Journal of the. Electrochemical Society," vol. 134 No. 6, pp. 1399-1402 (Jun. 1987).

* cited by examiner

BATTERY RESETTING PROCESS FOR SCAFFOLD FUEL ELECTRODE

CROSS REFERENCE TO RELATED APPLICATIONS

This application is a divisional of co-pending U.S. patent application Ser. No. 13/277,031, filed Oct. 19, 2011, which claims the benefit of priority to U.S. Provisional Application Ser. No. 61/394,954, the entire contents of both applications are incorporated herein by reference in their entireties.

FIELD

The present invention is generally related to an electrochemical cell, and more particularly to a metal-air cell.

BACKGROUND

Electrochemical cells using metal as the fuel are known. A type of electrochemical cell is a metal-air cell, which typically comprises a fuel anode at which metal fuel is oxidized, an air breathing cathode at which oxygen from ambient air is reduced, and an electrolyte for supporting reactions of the oxidized/reduced ions.

In some metal-air cells, such as those disclosed in U.S. patent application Ser. Nos. 12/385,489 and 12/901,410, both of which are incorporated herein by reference, the fuel anode comprises a plurality of scaffolded electrode bodies. Metal fuel is reduced and electrodeposited on the electrode bodies. One challenge with this type of design is ensuring that the growth does not prematurely short adjacent electrode bodies together, thus cutting short the opportunity for dense growth between the bodies.

In such scaffolded metal-air cells, manufacturing error, defects, and wear and tear of the air breathing cathode may result in some areas of fuel on the electrode bodies not being oxidized as rapidly as other areas when the cell is in a current generating mode. When such a cell is then placed in a charging mode, these areas of built-up fuel may cause premature formation of electrical connections between the electrode bodies, which may reduce charge capacity, overall cell efficiency, and energy stored in the battery.

Among other things, the present application endeavors to provide an effective and improved way of eliminating the areas of metal fuel from the fuel anode, effectively resetting the fuel anode of the fuel cell to a fresh chargeable condition.

SUMMARY

According to an aspect of the present invention, there is provided a method for resetting an electrochemical cell. The electrochemical cell includes a fuel electrode, an oxidant electrode spaced from the fuel electrode, a charging electrode selected from the group consisting of (a) the oxidant electrode, and (b) a third electrode spaced from the fuel and oxidant electrodes, and an ionically conductive medium contacting the electrodes. The fuel electrode and the oxidant electrode are configured to, during discharge, oxidize a metal fuel at the fuel electrode into a reducible fuel species and reduce an oxidant at the oxidant electrode to generate an electrical discharge current therebetween for application to a load. The fuel electrode and the charging electrode are configured to, during re-charge, reduce the reducible species of the fuel to electrodeposit the fuel on the fuel electrode and oxidize an oxidizable species of the oxidant by application of an electrical recharge current therebetween from a power source. The method includes applying an electrical reset current between the fuel electrode and at least one other aforesaid electrode of the cell with the fuel electrode functioning as an anode and the other aforesaid electrode functioning as a cathode, such that the metal fuel on the fuel electrode is oxidized into the reducible fuel species. By other aforesaid electrode, it is understood that if the charging electrode is the oxidant electrode, then the other aforesaid electrode is the oxidant electrode. If the charging electrode is the third electrode, however, then the other aforesaid electrode may be either the oxidant electrode or the third electrode. The method may also include removing the electrical reset current to discontinue the resetting process.

According to another aspect of the present invention there is provided an electrochemical cell system comprising an electrochemical cell and a controller. The electrochemical cell contains a fuel electrode having a series of permeable electrode bodies arranged in spaced apart relation for receiving electrodeposited metal fuel. The cell also has an oxidant electrode spaced apart from the fuel electrode, and a charging electrode spaced apart from the fuel electrode. The charging electrode is selected from the group consisting of (a) the oxidant electrode, and (b) a third electrode. The cell further contains an ionically conductive medium communicating the electrodes. The electrochemical cell system may also have circuitry configured to provide electrical connections between the fuel electrode, the oxidant electrode, and the charging electrode. The system may also contain a power input circuit and a power output circuit. There may also be a plurality of switches on the circuitry, configured to selectively open or close the electrical connections the between the fuel electrode, the oxidant electrode, the charging electrode, the power input circuit, and the power output circuit. In the cell system, the cell is configured to generate an electrical discharge current by oxidizing the metal fuel on the electrode bodies of the fuel electrode and reducing an oxidizer at the oxidant electrode. The spaced apart relation of the permeable electrode bodies of the fuel electrode may enable an electrical recharge current to be applied between the charging electrode and at least one of the permeable anode bodies, with the charging electrode functioning as an anode, and the at least one permeable electrode body functioning as a cathode. This configuration may enable reducible fuel ions to be reduced and electrodeposited from the ionically conductive medium as fuel in oxidizable form on the at least one permeable electrode body, whereby the electrodeposition causes growth of the fuel among the permeable electrode bodies, such that the electrodeposited fuel establishes an electrical connection between the permeable electrode bodies. The controller of the electrochemical cell system may be configured to control an open state or a closed state of each of the plurality of switches of the electrochemical cell in response to a control instruction. The controller may further be configured to selectively open and/or close the plurality of switches to apply an electrical reset current from a power source to the power input circuit, and between the fuel electrode and at least one other aforesaid electrode, with the fuel electrode functioning as an anode and the other aforesaid electrode functioning as a cathode, such that the metal fuel on the fuel electrode is oxidized into reducible fuel species. By other aforesaid electrode, it is again understood that if the charging electrode is the oxidant electrode, then the other aforesaid electrode is the oxidant electrode. If the charging electrode is the third electrode, however, then the other aforesaid electrode may be either the oxidant electrode or the third electrode. The controller may also be configured to selectively open and/or close the plurality of switches to remove the electrical reset current to discontinue the resetting process.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
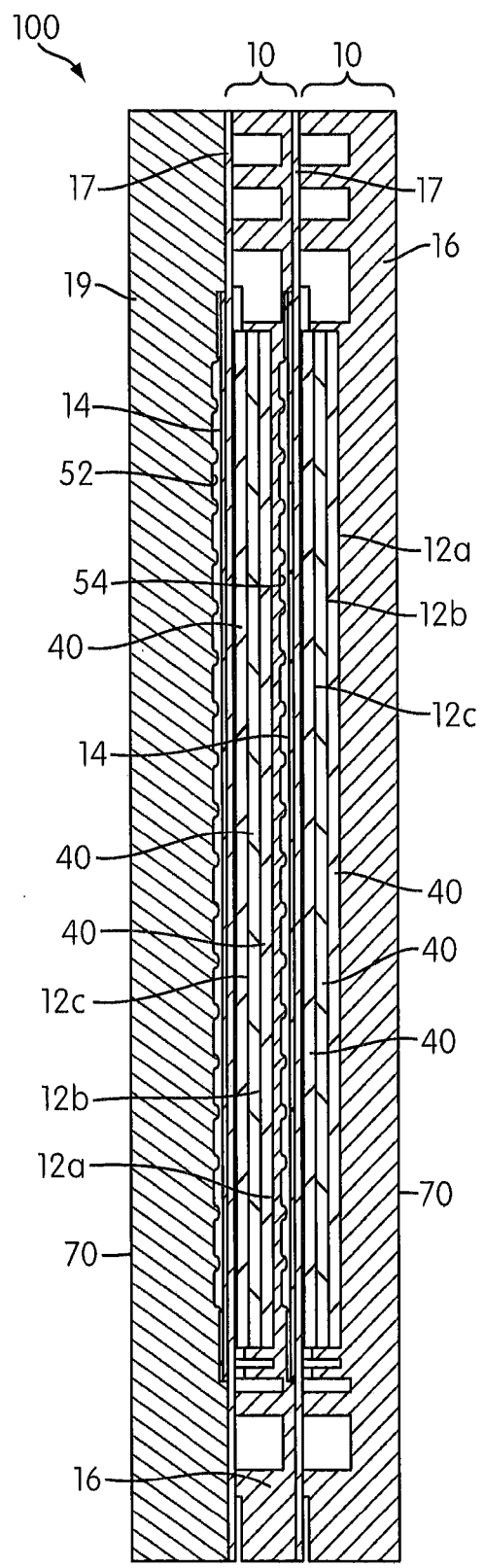
FIG. 1 illustrates a cross-sectional view of an electrochemical cell system that includes two electrochemical cells.
Figure 2:
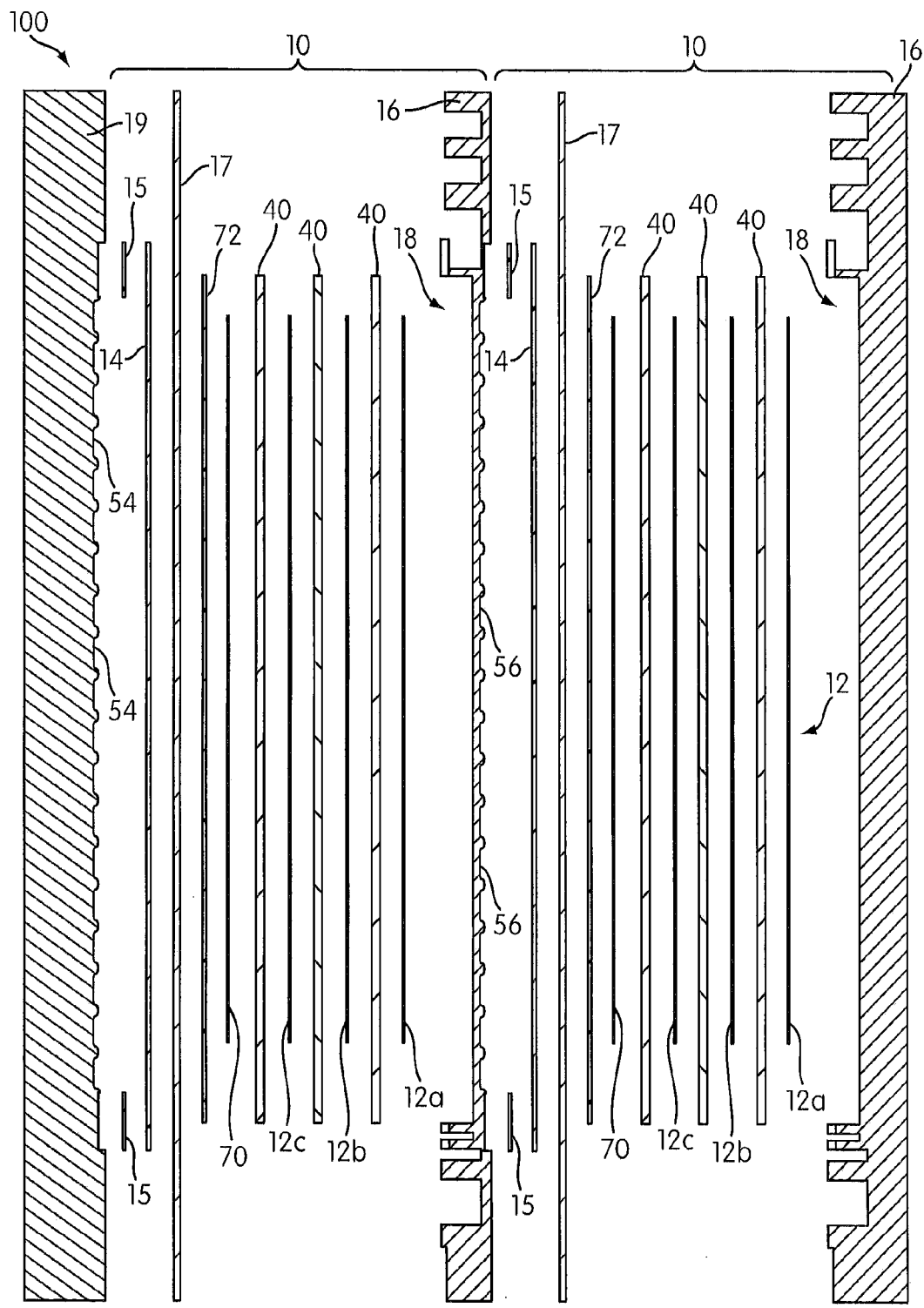
FIG. 2 illustrates an exploded view of the electrochemical cell system of FIG. 1.

FIGS. 1 and 2 illustrate an electrochemical cell system 100 that includes two electrochemical cells 10 according to an embodiment of the invention. As illustrated, each cell 10 includes a fuel electrode 12, and an oxidant electrode 14 that is spaced from the fuel electrode 12. The fuel electrode 12 supported by an electrode holder 16. The electrochemical system 100 also includes a cover 19 that is used to cover the electrochemical cells 10 on one side of the system 100, while one of the electrode holders 16 is used to cover the opposite side of the system 100, as illustrated in FIG. 1.

In an embodiment, the fuel electrode 12 is a metal fuel electrode that functions as an anode when the cell 10 operates in discharge, or electricity generating, mode, as discussed in further detail below. In an embodiment, the fuel electrode 12 may comprise a permeable electrode body 12a, such as a screen that is made of any formation able to capture and retain, through electrodepositing, or otherwise, particles or ions of metal fuel from an ionically conductive medium that circulates in the cell 10, as discussed in further detail below.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. The fuel may be provided to the cell 10 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid. In the non-limiting embodiment described herein, the medium is aqueous potassium hydroxide.

The fuel may be oxidized at the fuel electrode 12 when the fuel electrode 12 is operating as an anode, and an oxidizer, such as oxygen, may be reduced at the oxidant electrode 14 when the oxidant electrode 14 is operating as a cathode, which is when the cell 10 is connected to a load and the cell 10 is in discharge or electricity generation mode, as discussed in further detail below. The reactions that occur during discharge mode may generate by-product precipitates, e.g., a reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate. During a recharge mode, which is discussed in further detail below, the by-product precipitates, e.g., zinc oxide, may be reversibly reduced and deposited as the fuel, e.g., zinc, onto the fuel electrode 12, which functions as a cathode during recharge mode. During recharge mode, either the oxidant electrode 14, or a separate charging electrode 70, described below, functions as the anode. The switching between discharge and recharge modes is discussed in further detail below.

Figure 3:
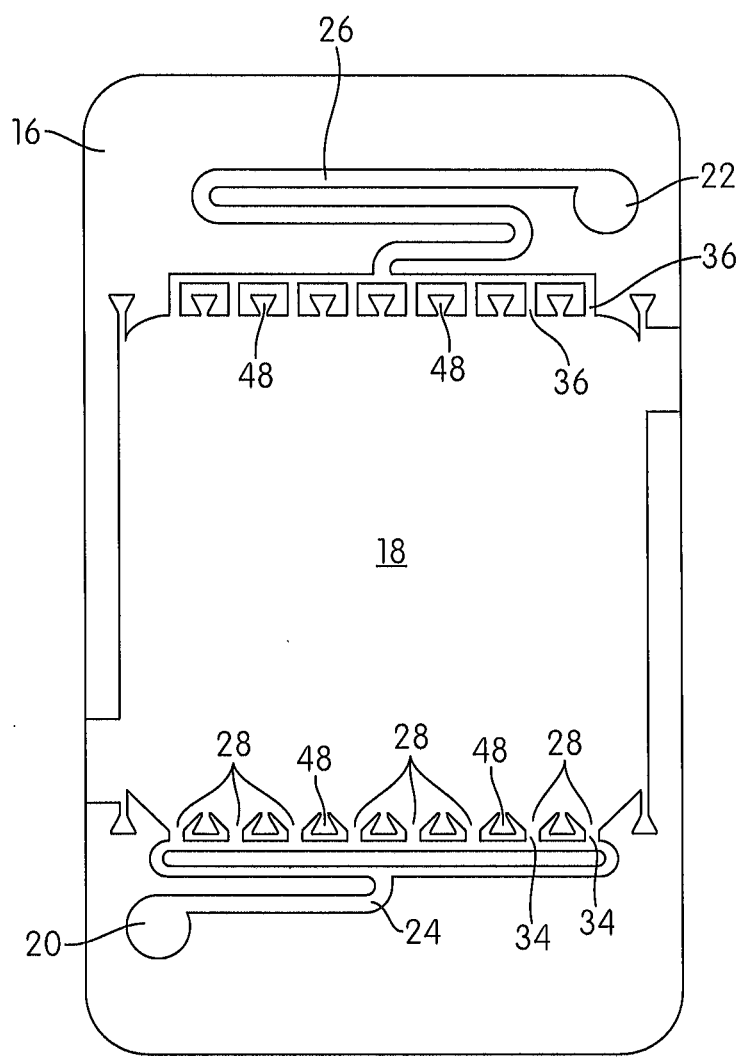
FIG. 3 illustrates an electrode holder of one of the electrochemical cells of FIG. 1.

The electrode holder 16 defines a cavity 18 in which the fuel electrode 12 is held. The electrode holder 16 also defines an inlet 20 and an outlet 22 for the cell 10. The inlet 20 is configured to allow the ionically conductive medium to enter the cell 10 and/or recirculate through the cell 10. The inlet 20 may be connected to the cavity 18 via an inlet channel 24, and the outlet 22 may be connected to the cavity 18 via an outlet channel 26. As illustrated in FIG. 3, the inlet channel 24 and the outlet channel 26 may each provide a meandering tortuous path through which the ionically conductive medium may flow. The meandering path defined by the inlet channel 24 preferably does not include any sharp corners in which the flow of the medium may become stagnated or in which any particulates in the medium may collect. As discussed in further detail below, the length of the channels 24, 26 may be designed to provide an increased ionic resistance between cells that are fluidly connected in series.

For each cell 10, a permeable seal member 17 may be bonded between sealing surfaces on the electrode holders 16 and/or the cover 19, as appropriate, to enclose at least the fuel electrode 12 in the cavity 18. The seal member 17 also covers the inlet and outlet channels 24, 26. The seal member 17 is non-conductive and electrochemically inert, and is preferably designed to be permeable to the ionically conductive medium in the orthogonal direction (i.e., through its thickness), without permitting lateral transport of the ionically conductive medium. This enables the ionically conductive medium to permeate through the seal member 17 for enabling ion conductivity with the oxidant electrode 14 on the opposing side to support the electrochemical reactions, without "wicking" the ionically conductive medium laterally outwardly from the cell 10. A few non-limiting examples of a suitable material for the seal member 17 are EPDM and TEFLON®.

In the illustrated embodiment, the cavity 18 has a generally rectangular, or square, cross-section that substantially matches the shape of the fuel electrode 12. One side of the cavity 18, specifically, the side of the cavity 18 that is connected to the inlet channel 24, includes a plurality of fluidization zones 28 that are each connected to the inlet channel 24 via a manifold that includes a plurality of cavity inlets 34 so that when the ionically conductive medium and precipitates or reducible fuel species enter the cavity 18, the ionically conductive medium and fuel enter the fluidization zones 28. As shown in greater detail in FIG. 7, each fluidization zone 28 is partially defined by two surfaces 30, 32 that are angled with respect to each other but do not touch each other so as to define diverging surfaces with respect to an axis that extends from the inlet 34 through the center of the fluidization zone 28. In the illustrated embodiment, the surfaces 30, 32 substantially define a "V" with an open bottom that is open to the inlet 34, as illustrated in FIG. 3. Although the illustrated embodiment shows the surfaces 30, 32 as being relatively straight, the surfaces may be curved or partially curved, so long as the surfaces 30, 32 are diverging from the inlet 34.

Figure 7:
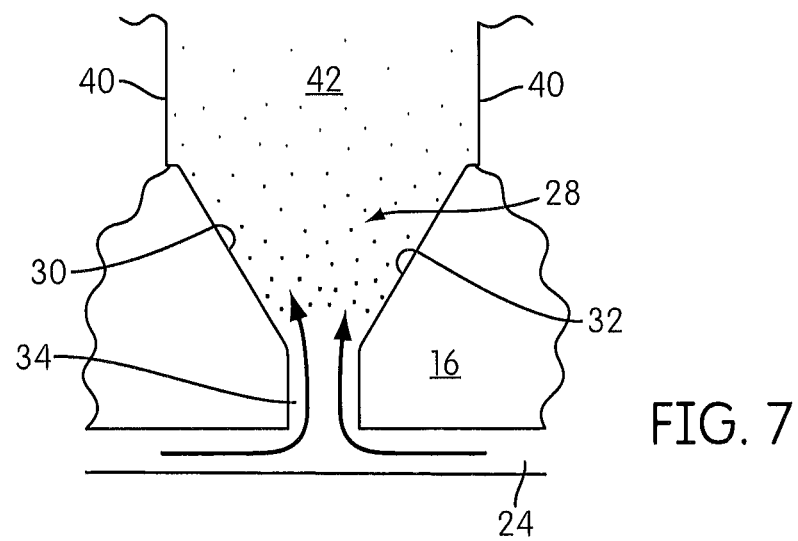
FIG. 7 illustrates a fluidization zone defined in part by the electrode holder of FIG. 3 in greater detail.

The fluidization zones 28 are configured so that as the ionically conductive medium with particulates flows into the cavity 18 via the inlet channel 24, the particulates are fluidized in the ionically conductive medium, which allows for the particulates to be more evenly dispersed in the ionically conductive medium as the ionically conductive medium contacts the fuel electrode 12. This is particularly advantageous when the electrochemical cell 10 is oriented with the open bottom of the V-shaped fluidization zones 28 is pointed downward, as illustrated in FIG. 7. This is because gravity will tend to cause the particulates to accumulate at the inlet end of the cavity 18 between the inlet channel 24 and the outlet channel 26. By fluidizing the particulates in the ionically conductive medium, and by providing a pressure drop across the cavity 18, as discussed in further detail below, the particulates will flow more evenly across the cavity 18, with substantially less or no accumulation at the inlet end of the cavity 18. This may improve the efficiency of the cell 10 by providing a more even distribution of the particulates across the surface of the fuel electrode 12.

Figure 4:
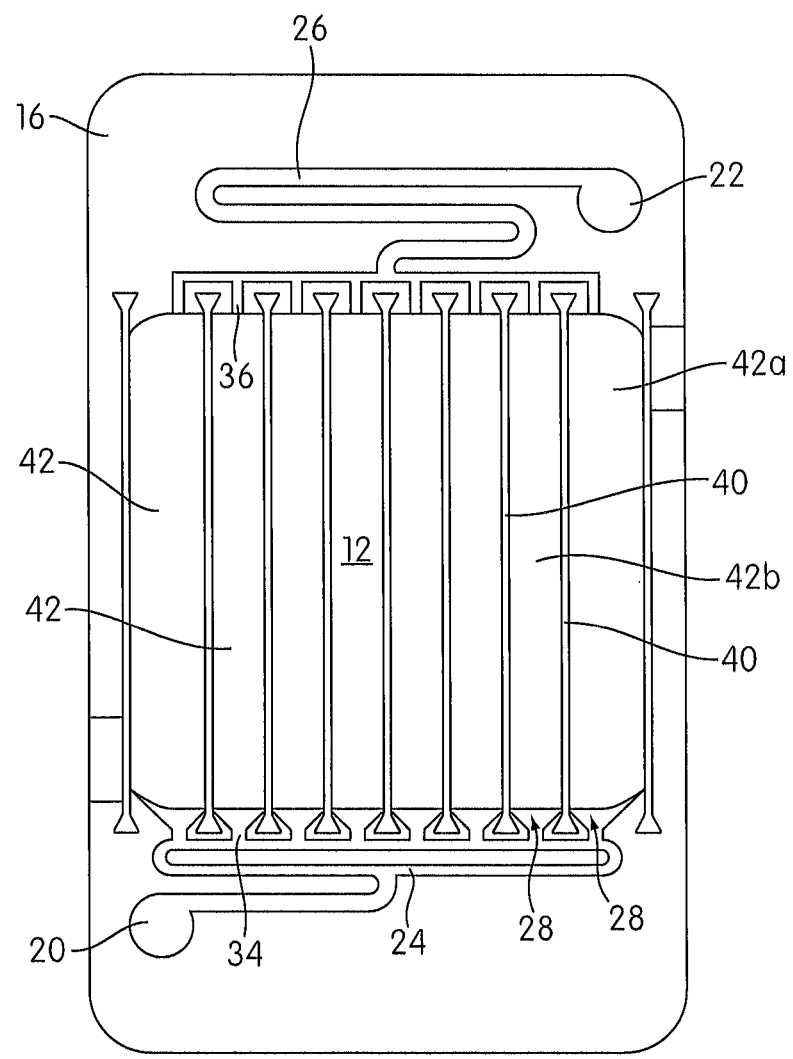
FIG. 4 illustrates the electrode holder of FIG. 3 holding a fuel electrode and a plurality of spacers connected to the electrode holder.

As illustrated in FIG. 4, a plurality of spacers 40, each of which extends across the fuel electrode 12 in a spaced relation to each other, are connected to the electrode holder 16 so that the fuel electrode 12 may be held in place relative to the electrode holder 16 and to the oxidant electrode 14. In an embodiment, the fuel electrode 12 may contain a plurality of permeable electrode bodies 12a-12c, as illustrated in FIG. 2, which may be separated by sets of the plurality of spacers 40, so that each set of spacers 40 is positioned in between adjacent electrode bodies to electrically isolate the electrode bodies 12a-12c from each other. Within each set of spacers 40 between adjacent electrode bodies, the spacers 40 are positioned in a spaced relation in a manner that creates so-called "flow lanes" 42 therebetween, as discussed in greater detail below. The flow lanes 42 are three-dimensional and have a height that is substantially equal to the height of the spacers 40. In an embodiment, the spacers may be provided by a single frame that has cut-outs corresponding to the flow lanes. In an embodiment, the flow lanes may include a foam or honeycomb-type structure that is configured to allow the ionically conductive medium to flow therethrough. In an embodiment, the flow lanes may include an array of pins that are configured to disrupt the flow of the ionically conductive medium through the flow lanes. The illustrated embodiment is not intended to by limiting in any way.

The spacers 40 are non-conductive and electrochemically inert so they are inactive with regard to the electrochemical reactions in the cell 10. The spacers 40 are preferably sized so that when they are connected to the electrode holder 16, the spacers 40 are in tension, which allows the spacers 40 to press against the fuel electrode 12, or one of the electrode bodies 12a-12c, so as to hold the fuel electrode 12 or bodies thereof in a flat relation relative to the electrode holder 16. The spacers 40 may be made from a plastic material, such as polypropylene, polyethylene, noryl, fluoropolymer, etc. that allows the spacers 40 to be connected to the electrode holder 16 in tension.

Figure 5:
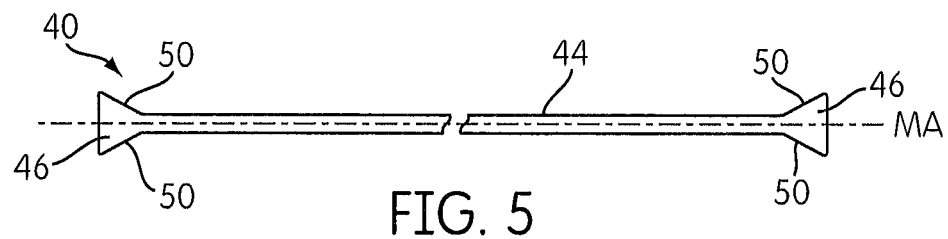
FIG. 5 illustrates one of the spacers of FIG. 4 in greater detail.
Figure 6:
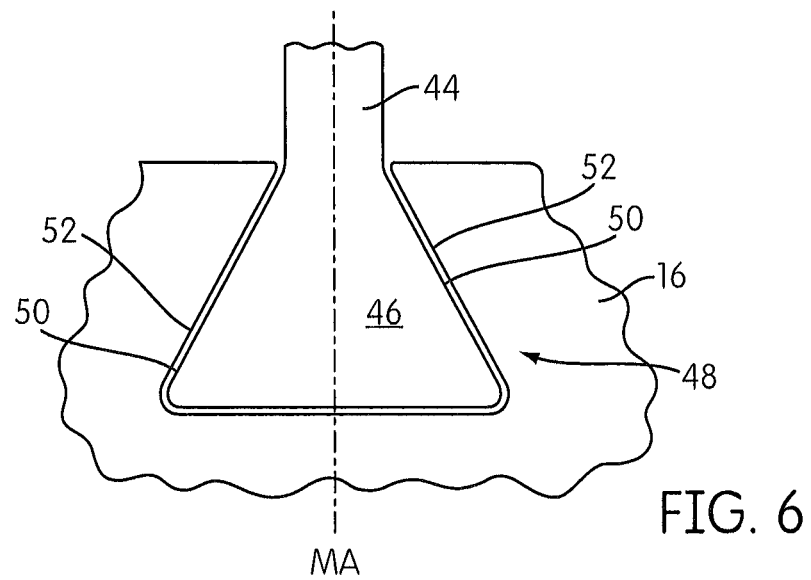
FIG. 6 illustrates a connection between the spacer of FIG. 5 and the electrode holder of FIG. 3 in greater detail.

In the embodiment illustrated in FIG. 5, each spacer has an elongated middle portion 44, and a shaped connecting portion 46 at each end. The shaped connecting portions 46 are configured to be held by openings 48 having substantially similar shapes in the electrode holder 16, as illustrated in FIG. 6. In the illustrated embodiment, the shaped portions 46 and the openings 48 have a substantially triangular shape, although the illustrated shape is not intended to be limiting in any way. The substantially triangular shape provides surfaces 50 on opposite sides of the elongated portion 44 of the spacer 40 that are configured to contact corresponding surfaces 52 on the electrode holder 16. Because the surfaces 50, 52 are angled with respect to a major axis MA of the elongated portion 44 of the spacer 40 and the tension in the spacer 40 will be along the major axis MA, the forces created by the tension may be distributed across a larger surface, as compared to a shaped portion having a circular or square shape with the same area.

Once the spacers 40 have been connected to the electrode holder 16 via the end portions 46, the flow lanes 42 are defined across the cavity 18 of the electrode holder 16. The spacers 40 are configured to essentially seal off one flow lane 42a from an adjacent flow lane 42b, that is separated by one of the spacers 40 so that the ionically conductive medium is guided to generally flow in substantially one direction. Specifically, the ionically conductive medium may generally flow in a fuel direction FD across the fuel electrode 12, from the inlet channel 24 to the outlet channel 26. A suitable pressure drop is generated between the inlet channel 24 and the fluidization zones 28 so that the ionically conductive medium may flow across the cavity 18 and to the outlet channel 26, even when the cell 10 is oriented such that the flow is substantially upward and against gravity. In an embodiment, the ionically conductive medium may also permeate through the fuel electrode 12, or an individual permeable electrode body 12a-12c, in a second direction SD and into a flow lane that is on the opposite side of the fuel electrode 12 or permeable electrode body 12a-12c.

Figure 8:
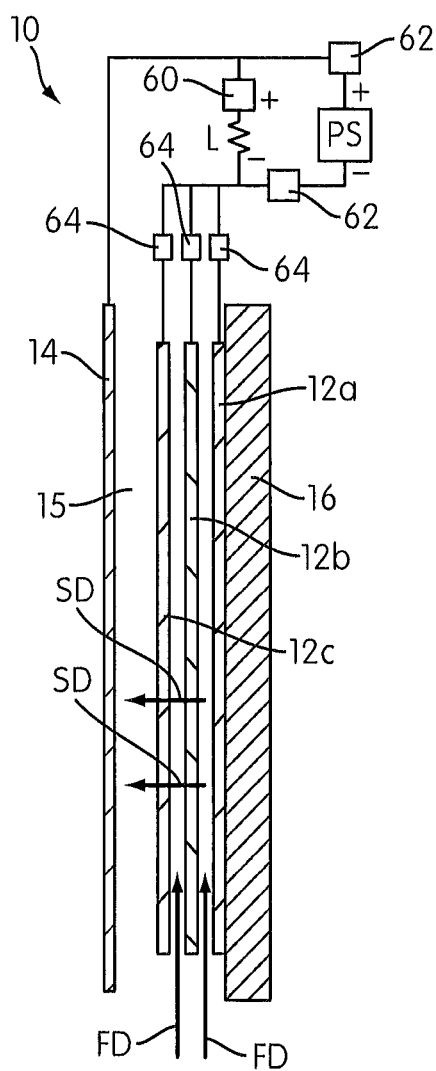
FIG. 8 schematically illustrates electrical connections between the electrochemical cell and an external load and a power supply according to an embodiment of the present invention FIG. 9 schematically illustrates electrical connections between the electrochemical cell and an external load and a power supply according to an embodiment of the present invention.

As illustrated in FIG. 8, the fuel electrode 12 is connected to an external load L so that electrons given off by the fuel as the fuel is oxidized at the fuel electrode 12 flow to the external load L. The external load L may be coupled to each of the permeable electrode bodies 12a-12c in parallel, as described in detail in U.S. patent application Ser. No. 12/385,489, filed on Apr. 9, 2009 and incorporated herein by reference.

The oxidant electrode 14 functions as a cathode when the oxidant electrode 14 is connected to the external load L and the cell 10 operates in discharge mode. When functioning as a cathode, the oxidant electrode 14 is configured to receive electrons from the external load L and reduce an oxidizer that contacts the second electrode 14. In an embodiment, the oxidant electrode 14 comprises an air breathing electrode and the oxidizer comprises oxygen in the surrounding air.

The oxidizer may be delivered to the oxidant electrode 14 by a passive transport system. For example, where oxygen present in ambient air is the oxidizer, simply exposing the oxidant electrode 14 to ambient air via openings in the cell, such as the openings that are provided by grooves 54 in the cover 19 and grooves 56 in the electrode holder 16 provided in the center of the electrochemical cell system 100, may be sufficient to allow diffusion/permeation of oxygen into the oxidant electrode 14. Other suitable oxidizers may be used and embodiments described herein are not limited to the use of oxygen as the oxidizer. A peripheral gasket 15 may be positioned between the periphery of the oxidant electrode 14 and the cover 19 or electrode holder 16, as appropriate, to prevent the ionically conductive medium from leaking around the oxidant electrode 14 and into the area in the grooves 54, 56 for air exposure.

In other embodiments, a pump, such as an air blower, may be used to deliver the oxidizer to the oxidant electrode 14 under pressure. The oxidizer source may be a contained source of oxidizer. Likewise, when the oxidizer is oxygen from ambient air, the oxidizer source may be broadly regarded as the delivery mechanism, whether it be passive or active (e.g., pumps, blowers, etc.), by which the air is permitted to flow to the oxidant electrode 14. Thus, the term "oxidizer source" is intended to encompass both contained oxidizers and/or arrangements for passively or actively delivering oxygen from ambient air to the oxidant electrode 14.

Electricity that can be drawn by the external load L is generated when the oxidizer at the oxidant electrode 14 is reduced, while the fuel at the fuel electrode 12 is oxidized to an oxidized form. The electrical potential of the cell 10 is depleted once the fuel at the fuel electrode 12 is entirely oxidized or oxidation is arrested due to passivation of the fuel electrode (as described in greater detail below). A switch 60 may be positioned in between the oxidant electrode 14 and the load L so that the oxidant electrode 14 may be connected and disconnected from the load L, as desired.

To limit or suppress hydrogen evolution at the fuel electrode 12 during discharge mode and during quiescent (open circuit) periods of time, salts may be added to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution.

After the fuel in the cell 10 has been entirely oxidized, or whenever it is desirable to regenerate the fuel within the cell 10 by reducing the oxidized fuel ions back to fuel, the fuel electrode 12 and the oxidant electrode 14 may be decoupled from the external load L and coupled to a power supply PS with the use of suitable switches 62, as illustrated in FIG. 8. The power supply PS is configured to charge the cell 10 by applying an electrical current between the fuel electrode 12 and the oxidant electrode 14 such that the reducible species of the fuel is reduced and electrodeposited onto the permeable electrode bodies 12a-12c and the corresponding oxidation reaction takes place at the oxidant electrode 14, which is typically oxidation of an oxidizable species to evolve oxygen, which may be off-gassed from the cell 10. As described in detail in U.S. patent application Ser. No. 12/385,489, filed on Apr. 9, 2009 and incorporated herein by reference, as an option only one of the permeable electrode bodies, such as 12a, may be connected to the power supply PS so that the fuel reduces onto the permeable electrode body and progressively grows to and on the other permeable electrode bodies 12b-12c, one by one. The switches 62 may control when the cell 10 operates in discharge mode and in charge mode. Additional switches 64 may isolate each of the permeable electrode bodies, so that one, some, or all of the permeable electrode bodies are connected or disconnected to the remainder of the cell 10.

Any suitable control mechanism may be provided to control the action of the switches 60, 62, 64 between the open and closed positions. For example, a relay switch that is biased toward the open position may be used, with an inductive coil coupled to the power supply that causes closure of the switch when charging begins. Further, a more complex switch that allows for individual connection to the permeable electrode bodies 12a-12c could be used to provide the connection/disconnection to and from the load, and to and from each other.

Figure 9:
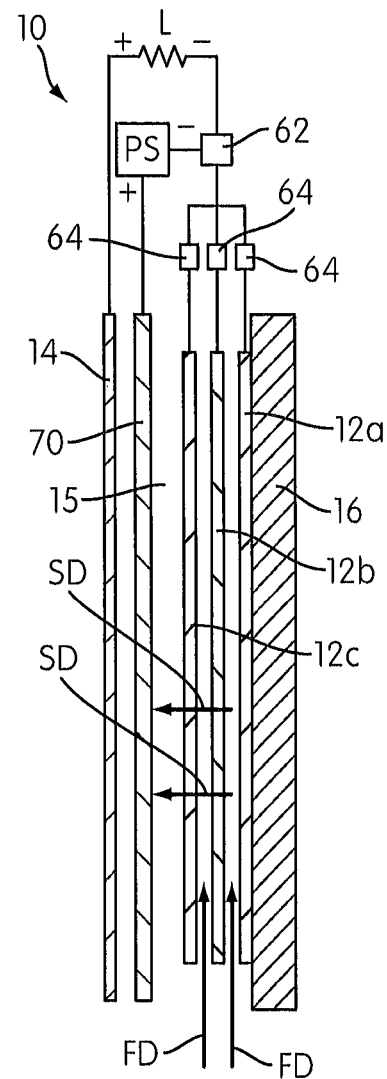

FIG. 9 shows an embodiment where a third electrode 70 is provided to function as the charging electrode, rather than the oxidant electrode 14. As illustrated in FIG. 2, the third electrode 70 may be positioned between the fuel electrode 12 and the oxidant electrode 14, with a spacer 72 and the seal member 17 being positioned between the third electrode 70 and the oxidant electrode 14. The spacer 72 is non-conductive and has openings through which the ionically conductive medium may flow.

In the embodiment described above with respect to FIG. 8, the oxidant electrode 14 functions as the cathode during power generation/discharge, and as the anode during charging, as described above. In FIG. 9, the load is coupled in parallel to each of the permeable electrode bodies 12a-12c of the fuel electrode 12, and also to the third electrode 70 during recharge. During current generation, the fuel on the fuel electrode 12 is oxidized, generating electrons that are conducted to power the load L and then conducted to the oxidant electrode 14 for reduction of the oxidizer (as discussed in more detail above).

It is also possible in any of the embodiments of the invention to apply the cathodic potential simultaneously to all the electrode bodies 12a-12c of the fuel electrode 12, rather than to just one to produce body-by-body progressive growth. Progressive growth emanating from one terminal is advantageous because it provides more density. Specifically, the growth in the previously connected electrode bodies continues as each subsequent body is connected by the progressing growth. With all the electrode bodies subject to the same potential, the growth will only occur until a short occurs between the charging electrode, which is the oxidant electrode 14 in the embodiment of FIG. 8 and the third electrode 70 in the embodiment of FIG. 9, and the electrode body proximate to it. Thus, it is possible to have a faster, but less dense, growth in this manner, which may be amenable to certain re-charging needs.

The embodiments illustrated in FIGS. 8 and 9 should not be considered to be limiting in any way and are provided as non-limiting examples of how the cell 10 may be configured to be rechargeable. U.S. patent application Ser. No. 12/885,268, filed on Sep. 17, 2010, the entire content of which is incorporated herein by reference, describes embodiments of a rechargeable electrochemical cell system with charge/discharge mode switching in the cells.

In addition, any of the embodiments of the switches described above (e.g., to enable the charge mode, and discharge mode) may also be used with a plurality of electrochemical cells having a dynamically changing oxygen evolving (i.e., charging) electrode/fuel electrode, such as the progressive one described in U.S. patent application Ser. No. 13/230,549, incorporated in its entirety herein by reference. For example, as described in U.S. patent application Ser. No. 13/230,549, each cell 10 may also have its own plurality of switches associated with the electrode bodies to enable progressive fuel growth.

For example, in an embodiment, during charging, the charging electrode of each cell 10 may be coupled to the fuel electrode 12 of the subsequent cell 10. In an embodiment, during charging, a first electrode body 12a of the fuel electrode 12 may have a cathodic potential and the rest of the electrode bodies and/or a separate charging electrode may have an anodic potential. In such an embodiment, during the progressive fuel growth of the fuel electrode 12, the fuel may grow on the first electrode body 12a having the cathodic potential and cause a short with the adjacent electrode body 12b having the anodic potential. The adjacent electrode body 12b may then be disconnected from the source of anodic potential such that through electrical connection, the adjacent electrode body 12b also has the cathodic potential. This process may continue with the rest of the electrode bodies until no further growth is possible (i.e., the cathodic potential has shorted to the last electrode body having an anodic potential or a separate charging electrode). A plurality of switches may be provided to connect/disconnect the electrode bodies to one another and/or to sources of cathodic or anodic potential. Thus, in such embodiments having progressive fuel growth, the charging electrode may be a separate charging electrode from the fuel electrode 12 or may be at least the adjacent electrode body of the fuel electrode 12, up to all the other electrode bodies, having an anodic potential. In other words, the charging electrode may be a separate charging electrode, an electrode body having an anodic potential located adjacent to the at least one electrode body having a cathodic potential, and/or a group of electrode bodies having an anodic potential located adjacent to the at least one electrode body having a cathodic potential.

Thus, the charging electrode, as that term is used in the broader aspects of this application, need not necessarily be a static or dedicated electrode that only plays the anodic charging role (although it may be), and it may at times be a body or bodies within the fuel electrode to which an anodic potential is applied. Hence, the term dynamic is used to refer to the fact that the physical element(s) functioning as the charging electrode and receiving an anodic potential during charging may vary.

During discharging, the oxidant electrode 14 of a cell 10 may be operatively connected to the fuel electrode 12 of the subsequent cell 10 and fuel consumption would be through the electrode bodies (wherein the electrical connection between the electrode bodies are through fuel growth). If a cell 10 is not functioning properly or for other reasons, the cell 10 may also be bypassed using the bypass switching features, as described U.S. patent application Ser. No. 12/885,268.

Also, in some embodiments, the cells may be designed as "bi-cells." That term refers to a pair of air electrodes that are on opposing sides of a fuel electrode. During discharge, the air electrodes are at generally the same cathodic potential and the fuel electrode is at an anodic potential. Typically, a pair of dedicated charging electrodes may be disposed in the ionically conductive medium between the air electrodes and the fuel electrode. During charging, the charging electrodes are at generally the same anodic potential, and the fuel electrode is at a cathodic potential (alternatively, the charging electrode may dynamically charge, as described above). Thus, the air electrodes may share a common terminal, and the fuel electrode has its own terminal, and the charging electrodes may also share a common terminal. As such, electrochemically speaking, such a bi-cell may be regarded as a single cell (although within the bi-cell, certain aspects of the cell, such as bi-directional fuel growth, may cause a bi-cell to be considered as two cells for certain purposes; however, at a higher level for mode discharging and connection management, those aspects are less relevant and the bi-cell can be viewed as a single cell). In an embodiment, the pair of air electrodes may correspond to the oxidant electrode 14, the fuel electrode may correspond to the fuel electrode 12, and the pair of charging electrodes may correspond to the third electrode 70.

Returning to FIG. 4, after the ionically conductive medium has passed through the fuel electrode 12, the medium may flow into the outlet channel 26 that is connected to the outlets 36 of the cavity 18 of the electrode holder 16 and the outlet 22. The outlet 22 may be connected to the inlet 20 in embodiments where the medium is recirculated in the cell 10, or to an inlet of an adjacent cell, as discussed in further detail below, when a plurality of cells 10 are fluidly connected in series. In an embodiment, the outlet 22 may be connected to a vessel to collect the medium that has been used in the cell 10.

The cells 10 illustrated in FIGS. 1 and 2 may be fluidly connected in series. Details of embodiments of cells that are connected in series are provided in U.S. patent application Ser. No. 12/631,484, filed Dec. 4, 2009 and incorporated herein by reference in its entirety. The outlet 22 of a first cell 10 may be fluidly connected to the inlet 20 of a second cell 10, and the outlet 22 of the second cell 10 may be connected to the inlet 20 of a third cell, and so on. Although the embodiment of FIGS. 1 and 2 illustrates two cells 10, additional cells may be stacked and fluidly connected to the illustrated cells. Due to the meandering, tortuous paths that are created by the inlet channel 24 and the outlet channel 26, described above and illustrated in FIGS. 3 and 4, the length of the flow passageways for the medium via the channels 24, 26 is greater than the distance between the fuel electrode 12 and the oxidant electrode 14 in each of the cells 10. This creates an ionic resistance between the pair of fluidly connected cells that is greater than an ionic resistance within an individual cell 10. This may reduce or minimize internal ionic resistance loss of the stack of cells 100, as discussed in U.S. patent application Ser. No. 12/631,484, filed Dec. 4, 2009.

In operation, the fuel electrode 12, which already has metal fuel deposited thereon, is connected to the load L and the oxidant electrode 14 is connected to the load L. The ionically conductive medium enters the inlet 20 under positive pressure and flows through the inlet channel 24, the inlets 34 of the cavity 18, and into the fluidization zones 28 of the flow lanes 42. The ionically conductive medium flows across the permeable electrode bodies 12a-12c in the flow lanes 42 defined by the elongated middle portions 22 of the spacers 40. The ionically conductive medium may also permeate through the permeable electrode bodies 12a-12c of the fuel electrode 12. The ionically conductive medium simultaneously contacts the fuel electrode 12 and the oxidant electrode 14, thereby allowing the fuel to oxidize and conduct electrons to the load L, while the oxidizer is reduced at the oxidant electrode 14 via the electrons that are conducted to the oxidant electrode 14 by the load L. After the ionically conductive medium has passed through the flow lanes 42, the medium flows out of the cavity 18 via the outlets 36 of the cavity 18, through the outlet channel 24, and out the outlet 22 of the cell 10.

When the potential of the cell 10 has been depleted or when it is otherwise desirable to recharge the cell 10, the fuel electrode 12 is connected to the negative terminal of the power supply PS and the charging electrode, which is the oxidant electrode 14 in the embodiment illustrated in FIG. 8 and the third electrode 70 in the embodiment illustrated in FIG. 9, is connected to the positive terminal of the power supply PS. In the charging or recharge mode, the fuel electrode 12 becomes the cathode and the charging electrode 14, 70 becomes the anode. By providing electrons to the fuel electrode 12, fuel ions may reduce into fuel and redeposit onto the permeable electrode bodies 12a-12c while the ionically conductive medium circulates through the cell 10 in the same manner as described above with respect to the discharge mode.

The flow lanes 42 provide directionality and distribution of the ionically conductive medium across the fuel electrode 12. The fluidization zones 28 agitate the particulates and precipitates that have been formed during discharge mode of the cell 10 within the ionically conductive medium and prevent the particulates from settling out of the medium at the bottom of the cavity, which allows the particulates to flow with the ionically conductive medium across the fuel electrode 12. The flow lanes 42 may also prevent the particulates from settling and/or covering the electrodes. When the cell 10 is in charging mode, the improved distribution of the particulates across the fuel electrode 12 allow for a more uniform deposition of the reduced fuel onto the fuel electrode 12, which improves the density of the fuel on the fuel electrode 12, and increases the capacity and energy density of the cell 10, thereby enhancing the cycle-life of the cell 10. In addition, by having the ability to control the distribution of the precipitates or reaction by-product during discharge, early passivation/ deposition of the by-product on the fuel electrode 12 may be prevented. Passivation, which can comprise areas of fuel being covered by an oxide, preventing consumption of the fuel therein during discharge and/or further fuel growth thereon during charge, leads to lower fuel utilization and lower cycle life, which is undesirable, It may be appreciated that the electrochemical cell system 100 depicted herein is merely exemplary, and in other embodiments the functions or components of the electrochemical cells 10 or the electrochemical cell system 100 may vary. For example, in various embodiments, the ionically conductive medium may flow through multiple cells 10, or may circulate within a single cell 10. In some embodiments, the ionically conductive medium might generally not flow in the cell 10. It may be appreciated that portions of the electrochemical cell system 100, such as but not limited to one or more cells 10 therein, and/or the constituent portions thereof, may vary across embodiments. For example, various portions of each electrochemical cell 10 or other components of the electrochemical cell system 100 may be of any suitable structure or composition, including but not limited to being formed from plastic, metal, resin, or combinations thereof. Accordingly each cell 10 may be assembled in any manner, including being formed from a plurality of elements, being integrally molded, or so on. In various embodiments the cell(s) 10 and/or the housing(s) thereof may include elements or arrangements from U.S. Pat. No. 7,722,988 and/or one or more of U.S. patent application Ser. Nos. 12/385,217, 12/385, 489, 12/549,617, 12/631,484, 12/776,962, 12/885,268, 13/028,496, 13/083,929, 13/167,930, 13/185,658, 13/230, 549, and 61/414,579, each of which are incorporated herein in their entireties by reference. As such, embodiments of the present invention are not limited to the management of the reaction by-product that is generated during discharge mode, as described above, and reversibly reduced and electrodeposited as the fuel during recharge. Rather, embodiments of the present invention can be used where the reducible fuel species is different from the reaction by-product and is supplied separately.

In some metal-air fuel cells, including those of the type described, wherein there is at least an oxidant electrode and a scaffolded fuel electrode, imperfections in the oxidant electrode may reduce cell efficiency. FIGS. 10-16 show isolated schematic views of the cell 10, illustrating the growth morphology throughout the stack of electrode bodies 12a-12c in an exaggerated format to better understand the effect of such imperfections. Similar to FIG. 9, FIGS. 10-16 show an embodiment where a third electrode 70 is provided to function as the charging electrode, rather than the oxidant electrode 14. As was illustrated in the embodiment of FIG. 2, the third electrode 70 seen in the embodiments in FIGS. 10-16 is positioned between the fuel electrode 12 and the oxidant electrode 14. The third electrode 70 may have the spacer 72 and the seal member 17 being positioned between the third electrode 70 and the oxidant electrode 14. Also seen in FIGS. 10-16 is an imperfection 110 on the oxidant electrode 14. The detailed description of FIGS. 10-16 below demonstrates some undesirable effects of the imperfection 14 during the discharging and recharging of the cell 10.

Figure 10:
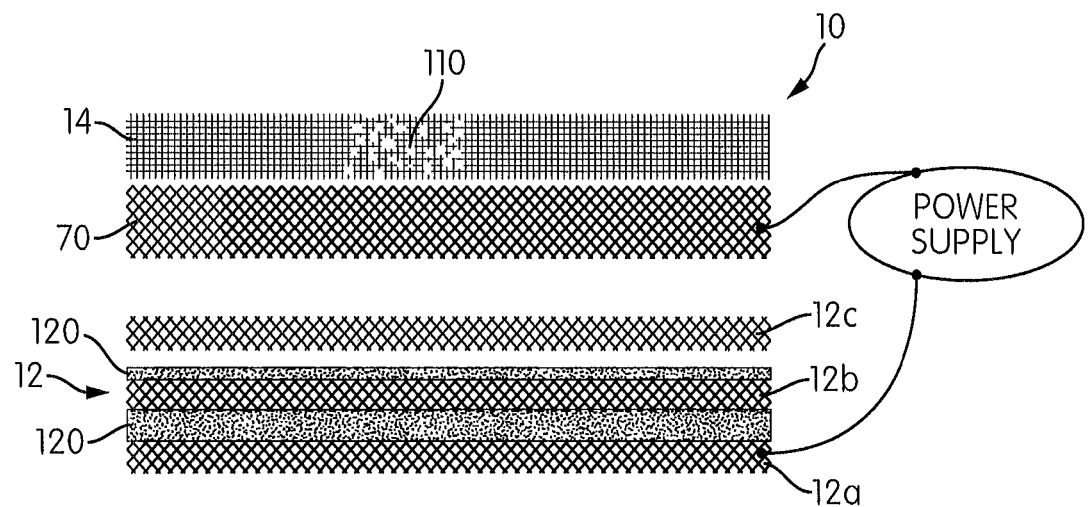
FIG. 10 is an isolated schematic view of the electrode bodies of an electrochemical cell having a defect in an air cathode, showing electrodeposited fuel growth thereon prior to the initial discharge of the cell.

In FIG. 10, the cell 10 is in a charging mode, wherein the fuel electrode 12 and the third electrode 70 are connected to a power supply. In this configuration, the fuel electrode 12 becomes the cathode, and the charging electrode 70 becomes the anode. By providing electrons to the fuel electrode 12, fuel ions may reduce into fuel and electrodeposit onto the permeable electrode bodies 12a-12c as a fuel growth 120, while the ionically conductive medium circulates through the cell 10. In the illustrated embodiment of the scaffolded configuration of the electrode bodies 12a-c, when the fuel electrode 12 is initially connected to the power supply, only electrode body 12a is electrically connected to the power supply. Therefore only electrode body 12a initially has a cathodic potential applied to it. During charging, as fuel ions are reduced into fuel deposited on the permeable electrode body 12a as the fuel growth 120, electrical connections eventually form with permeable electrode body 12b, creating a cathodic potential on electrode body 12b, as was described above. The fuel growth 120 seen in FIG. 10 exemplifies the cell 10 during its initial charging, or after a full re-setting (as discussed below), prior to any initiation of a discharging mode. At the stage of charging seen, the fuel growth 120 has electrically connected electrode bodies 12a and 12b through dense growth. The fuel growth 120 started to accumulate on electrode body 12b, however has not yet accumulated sufficiently to form an electrical connection with electrode body 12c.

Figure 11:
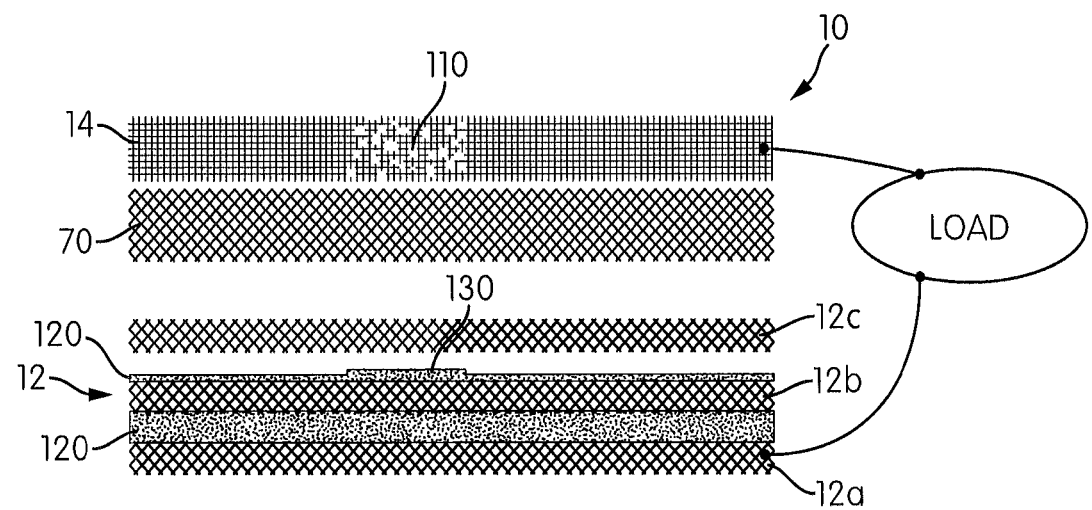
FIG. 11 shows the consumption of the metal fuel of FIG. 10 during discharge.
Figure 12:
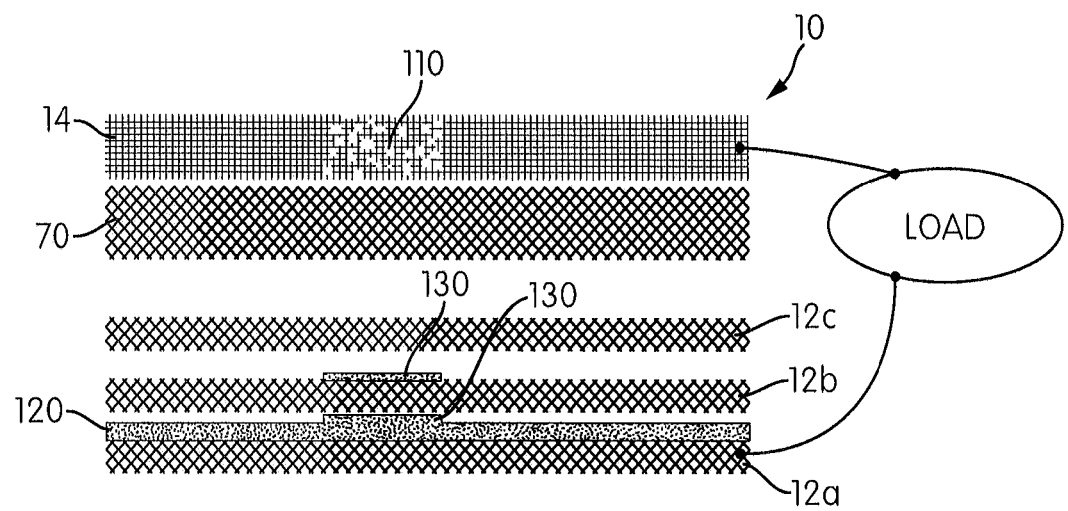
FIG. 12 shows the continued consumption of the metal fuel of FIGS. 10 and 11.

Turning now to FIGS. 11 and 12, the cell 10 is in a discharge or electricity generation mode. When the cell 10 is connected to a load, as was described above, the fuel may be oxidized at the fuel electrode 12, with the fuel electrode 12 operating as an anode, and an oxidizer (i.e. oxygen) may be reduced at the oxidant electrode 14, with the oxidant electrode 14 operating as a cathode. Due to the imperfection 110 of the oxidant electrode 14, oxidation of the fuel growth 120 may not be generally uniform, as may be the case with a hypothetical ideal cell 10. Instead, as seen in FIG. 11, the imperfection 110 may cause an area of under-oxidation 130, wherein the fuel growth 120 has not been oxidized into the ionically conductive medium to the same extent as in surrounding areas. In some cases, the location of the area of under-oxidation 130 on the electrode bodies 12a-c may correspond to the location of the imperfection 110 on the oxidant electrode 14.

Some areas of under-oxidation 130 may remain on the electrode bodies 12a-c even after the oxidation of fuel has caused there to no longer be an electrical connection between the electrode bodies 12a-c. An example of this may be seen in FIG. 12, where an area of under-oxidation 130 remains on electrode body 12b even though electrode body 12b is no longer electrically connected to electrode body 12a. In the illustrated embodiment, because there is no electrical connection between electrode bodies 12a and 12b, there is no further oxidation of the metal fuel in the area of under-oxidation 130 on electrode body 12b. One effect of this residual area of under-oxidation 130 on the unconnected electrode body 12b of the illustrated embodiment can be reduced capacity of the cell 10, resulting from the unutilized potential of the fuel in the area of under-oxidation 130. Depending on factors such as the nature of the imperfection 110, or for other reasons, such as passivation, some areas of under-oxidation 130 might not be oxidized and participate in electricity generation, even when the electrode body (i.e. electrode body 12b) remains connected to the load. For example, passivation can lead to some or all of the area of under-oxidation 130 being covered by an oxide, preventing further oxidation even when the electrode body remains connected to the load. Again, such passivation of fuel can also occur on other areas of electrode bodies 12a-c, not associated with imperfection 110 creating localized or broader areas that might not be oxidized and participate in electricity generation, and may prevent fuel growth thereon during subsequent charging.

Figure 13:
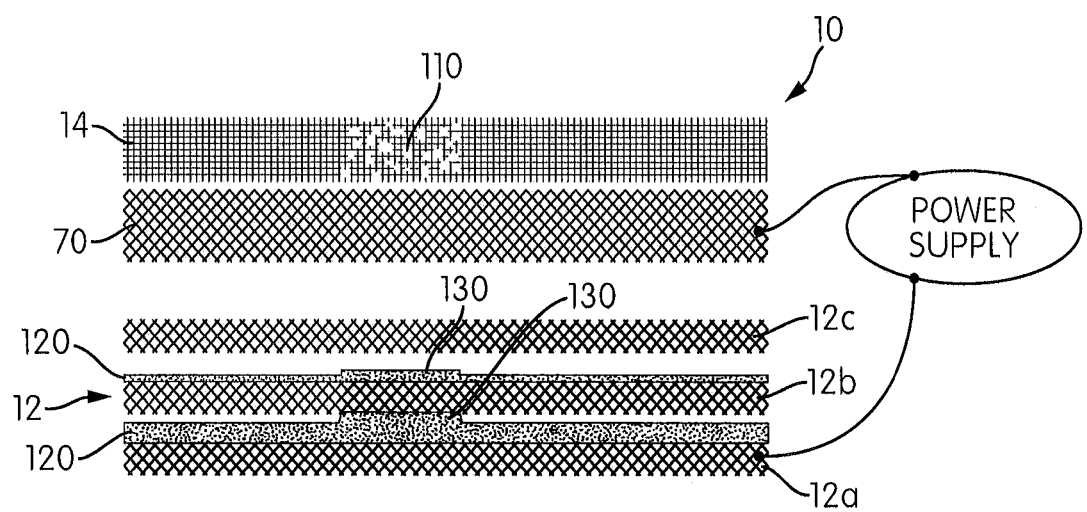
FIG. 13 shows the growth of the metal fuel of FIGS. 10-12 during the recharging of the electrochemical cell.

FIGS. 13-16 show that such areas of under-oxidation 130 may also reduce the capacity of the cell 10 when the cell 10 is placed in a charging mode while areas of under-oxidation 130 exist on the electrode bodies 12a-c. FIG. 13, for example, shows the cell 10 returned from the electricity generating mode of FIG. 12 to a charging mode, wherein the fuel electrode 12 and the third electrode 70 are reconnected to the power supply. As seen, the fuel growth 120 builds on and generally follows the contours of electrode body 12a, including on the unconsumed fuel growth 120 existing thereon, such as the area of under-oxidation 130. Although shown in exaggerated form in FIG. 13, it can be seen that an electrical connection may form between electrode body 12a and electrode body 12b at the area of under-oxidation 130 prior to anywhere else between the electrode bodies 12a-b. Once this electrical connection is formed, and a cathodic potential is applied to electrode body 12b, fuel growth 120 accumulates on electrode body 12b. In some embodiments, once this electrical connection forms, the fuel growth on prior electrode bodies, such as electrode body 12a, may be reduced due to initiation of growth on the newly connected body, preventing dense growth throughout the stack of permeable electrode bodies 12a-b, thus reducing overall capacity and cell efficiency.

Figure 14:
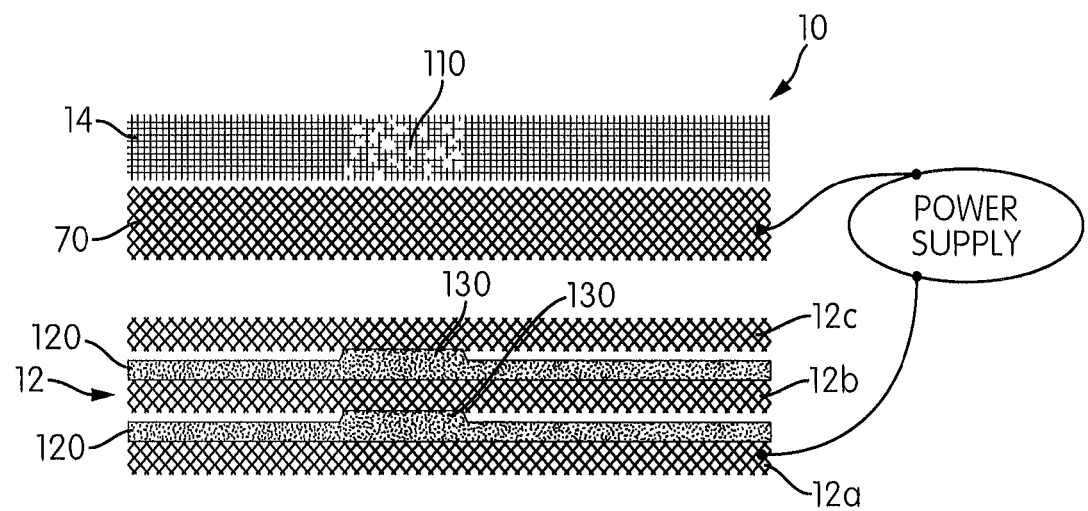
FIG. 14 shows the continued growth of the metal fuel of FIG. 13.

As seen in the transition from FIG. 13 to FIG. 14, the fuel growth 120 on electrode body 12b may generally follow the contours of the surface of the electrode body 12b, including on the area of under-oxidation 130 remaining on electrode body 12b from the prior discharge of the cell 10 seen in FIGS. 11 and 12. The continued accumulation of fuel growth 120, including on the area of under-oxidation 130 on the electrode body 12b, eventually may form an electrical connection with electrode body 12c. Again this electrical connection may occur in the area of under-oxidation 130 prior to anywhere else between electrode bodies 12b and 12c.

Figure 15:
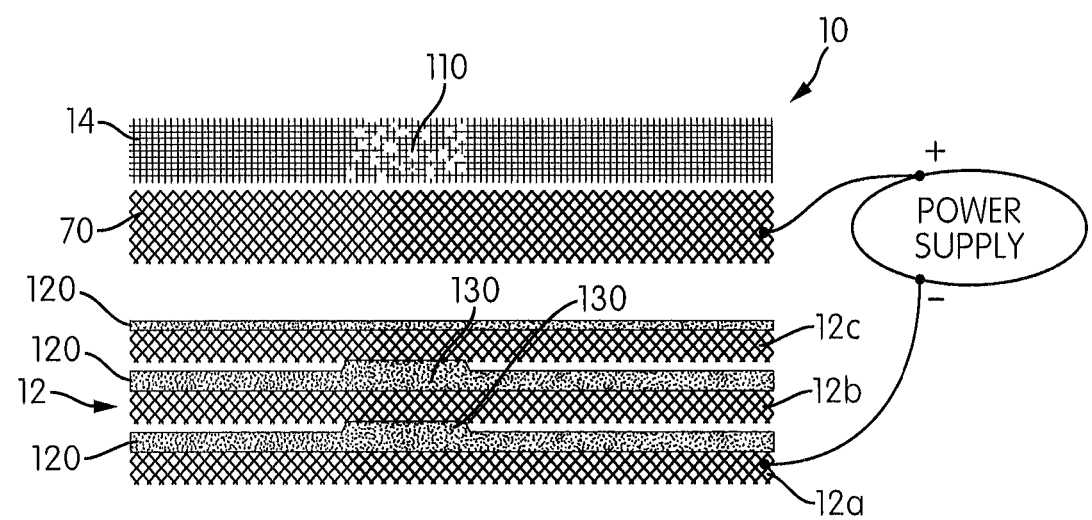
FIG. 15 shows the continued growth of the metal fuel of FIGS. 13 and 14.
Figure 16:
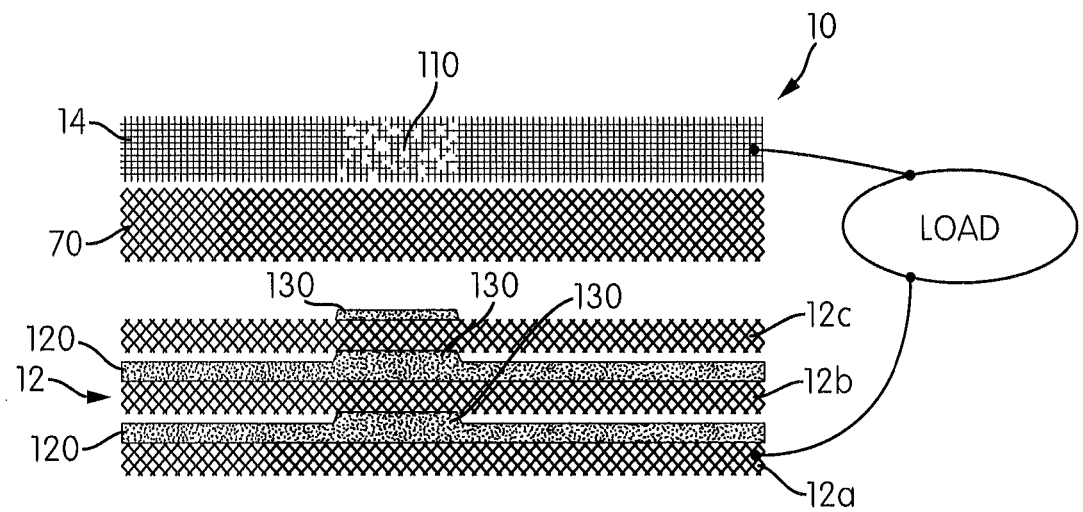
FIG. 16 shows the consumption of the metal fuel of FIG. 15 during discharge.

Because the initial charging of the cell 10 seen in FIG. 10 did not accumulate fuel growth 120 on electrode body 12c, there was no area of under-oxidation 130 on electrode body 12c remaining from the initial discharge utilizing the oxidant electrode 14 with the imperfection 110. Therefore, as seen in FIG. 15, wherein the recharging of the cell 10 has progressed such that the fuel growth 120 is occurring for the first time on electrode body 12c, the fuel growth 120 there may again be generally uniform. However, as FIG. 16 demonstrates, once the cell 10 is placed back into an electricity generating mode, a new area of under-oxidation 130 may begin to form on electrode body 12c as a result of the imperfection 110.

In summary, areas of under-oxidation 130 on the scaffold electrode body 12c cause non-uniform electrical field and current distribution, which may lead to non-uniform deposits and poor cycleability of the fuel electrode 12. Also, the overpotential for fuel (i.e. zinc) deposition on the conducting scaffold electrode body 12c (i.e. formed from nickel or copper) is higher than the overpotential for fuel deposition on fuel present in under-oxidized areas, which may further result in non-uniform fuel growth 130, which may lower the charge capacity and result in poor cycleability of the fuel electrode 12.

One can visualize the problem of non-uniform growth with an under-oxidation area by envisioning a board with a coat of paint 3 mm thick, and drawing a circle around an area representing the area of under-oxidation 130. During "discharge," all 3 mm of the paint is removed from the area around the circle (which is analogous to the fuel being oxidized off the electrode body), but in the circled "under-oxidation" area only 2 mm of the paint's thickness is removed, leaving a 1 mm "deposit" of paint in the "under-oxidation" area. During recharging, as the paint is reapplied in an even manner (which is analogous to the fuel being deposited on the electrode body), the "under-oxidation" area within the circle will reach the 3 mm thickness, but the surrounding area will only have 2 mm of paint thickness. Using this analogy, it can be appreciated how the area of under-oxidation 130 can bridge the gap between adjacent electrode bodies 12a-c more quickly, leaving less fuel (or paint in the analogy) deposited around it. Of course, this analogy is exaggerated and in reality a defect may cause under-oxidation to differ by a very small percentage—but over a number of cycles this small percentage can exacerbate and create the same problem.

One aspect of the present invention is a method of forcing oxidation of the otherwise unoxidized metal fuel remaining in the area of under-oxidation 130, placing the cell 10 in a resetting mode to perform a resetting process. The areas of under-oxidation 130 may result from non-uniform fuel growth, passivated fuel, or for any other reason. Such forced oxidation of the metal fuel may eliminate the areas of under-oxidation 130, so as to prevent the formation of premature electrical connections between electrode bodies 12a-c in the areas of under-oxidation 130 prior to the formation of electrical connections elsewhere in the fuel electrode 12, By preventing such premature electrical connections, the efficiency of cell 10 may improve by allowing dense fuel growth 120 between the scaffolded electrode bodies 12*a-c*.

The forced oxidation of the metal fuel may also or alternatively eliminate passivated fuel deposits, restoring the electrode bodies 12*a-c* to a zero state of charge. Such forced oxidation of passivated regions of metal fuel, by a resetting process at potential and current conditions corresponding to a transpassive region, may eliminate the areas of under-oxidation 130. Thus, the formation of premature electrical connections between electrode bodies 12*a-c* in the areas of underoxidation 130 prior to the formation of electrical connections elsewhere in the fuel electrode 12 may be prevented. By preventing such premature electrical connections, the efficiency and charge capacity of cell 10 may improve by allowing dense fuel growth 120 between the scaffolded electrode bodies 12*a-c*.

In some embodiments, the forced oxidation of the metal fuel may be desirable as a routine or preventative maintenance procedure. In an embodiment, forcing oxidation of the metal fuel may be utilized so as to place the cell 10 in a transpassive regime, reducing the potential for some of the metal fuel to passivate. For example, as the metal fuel on the electrode bodies 12*a-c* is depleted, the voltage will begin to drop, and the current will begin to spike, through the cell 10. In a zinc-air battery, zinc may be oxidized without passivation at potentials of 800 mV or above using an external load or resistor circuit. By continuing to drain the cell 10 under these conditions, the cell 10 may enter a passivation regime, wherein passivation of the fuel becomes more likely. By applying a small current to force oxidation of the remaining fuel at that time, discussed in greater detail below, the cell 10 may be in a transpassive regime, where the oxide on the metal fuel surface may be porous and the metal fuel under the oxide may continue oxidation.

During operation of the cell 10, a decision may be made as to whether a reset of the cell 10 would benefit the charge capacity of cell 10. In some embodiments, the resetting process may be repeated a plurality of times. A decision to perform the resetting process may be made based on any suitable consideration. For example, in an embodiment, the passage of any set interval of time may be used to trigger a resetting process. In an embodiment, a randomized interval of time may be utilized. In some embodiments, the decision to reset the cell 10 may be based on the passage of an interval of time from when the cell 10 was known to be in an efficient state, such as prior to the first discharge of the cell, or since the previous iteration of the resetting process. For example, in some embodiments the cell 10 may be reset every 500 hours of discharge, or after fifty charge-discharge cycles. In some embodiments the duration of the reset process may range from ten minutes to one hour. The present invention is not intended to be limited to the duration of the reset process or the interval between resets on the cell 10.

Another consideration that may be utilized to determine if the resetting process should be initiated on the electrochemical cell 10 may include a measurement of the charge capacity of the electrochemical cell 10. If a sensor were to be attached to the electrochemical cell 10, for example, to measure the charge capacity of the cell 10, the sensed present charge capacity could be compared to a value taken at a previous time, preferably at a time when it is known that no area of under-oxidation 130 exists on the electrode bodies 12*a-c* (such as prior to the first discharge of the cell 10, or immediately following a previous resetting process). If for example, the present charge capacity is less than the previous charge capacity by a greater than threshold amount, it may be determined that a resetting process should be initiated. As another non-limiting example, a sensor to detect the presence of unoxidized metal fuel when the cell 10 is depleted of charge may also be used to determine if the resetting process is needed. Again, a threshold amount of unoxidized metal fuel may be determined as permissible in the cell 10 despite the charge depleted state. In an embodiment, it may be determined that the resetting process should be initiated if a detected or computed charge capacity for the cell 10 is reduced to between 50-80% of a rated charge capacity.

In another embodiment, the resetting process may be initiated if the charge capacity in a previous cycle is lower than a target value before all of the electrode bodies are electrically connected to each other, potentially indicating non-uniform growth 130 of electrodeposited fuel. Electrical connections between the electrode bodies may be detected by a resistance or voltage measurement circuit. The resetting process may also be initiated if the charge capacity of a cell in a stack consisting of cells connected in series is lower than the average charge capacity of the stack. The reset may be performed on the individual cells or an array of cells through an electrical circuit comprising switches to connect or disconnect cells to the power supply during the reset process. In another embodiment, reset current may be applied after any given partial or complete discharge of the cell.

In some embodiments, the decision to initiate the resetting process may be made based upon a voltage or current measurement of the cell 10. Such a measurement may be useful when the reset process is a routine maintenance operation, to prevent the fuel from sufficiently depleting to place the cell in a passivation regime, or for any other reason. For example, in an embodiment, once the voltage of the cell reduces to a threshold amount, it may be determined that the resetting process should be initiated. In an embodiment, when the cell 10 is supplying between approximately 0.7 and 1 V under a load, the resetting process may be initiated. Likewise, if the current begins to increase over the cell 10, then the resetting process may also be desired. In an embodiment, the resetting process would be desired if the current through the cell 10 is measured at between approximately 10-75 mA/cm$^2$.

If it is determined that a resetting process is to be initiated on the electrochemical cell 10, then the method may continue. In some embodiments, the method may comprise flowing (or continuing to flow) the ionically conductive medium through the cell 10, including in various embodiments through the inlets 34 and into the flow lanes 42, or into the fluidization zones 28. The method may also comprise applying an electrical reset current from a power source between the fuel electrode 12 and the oxidant electrode 14, such that the fuel electrode 12 functions as an anode and the oxidant electrode 14 functions as a cathode. In such an embodiment, oxygen is reduced at the oxidant electrode 14, and any remaining fuel is oxidized at the fuel electrode 12. In another embodiment, the method may comprise applying the electrical reset current from a power source between the fuel electrode 12 and the third electrode 70 (i.e. the charging electrode). In such an embodiment, water is reduced at the third electrode 70, and any remaining fuel is oxidized at the fuel electrode 12. In an embodiment wherein the third electrode has a low hydrogen evolution potential, the water reduction and hydrogen evolution reaction occurs preferably over the fuel reduction/deposition reaction. In either embodiment, any fuel passivated by its oxide can be removed by maintaining the potential in the transpassive regime.

The application of the electrical reset current may be such that the metal fuel growth 120, and in particular the area of under-oxidation 130 on the electrode bodies 12*a-c* are oxidized into reducible fuel species, such as reducible fuel ions.

The amount of electrical reset current may be any suitable amount that may drive the electrochemical reaction that may oxidize the metal fuel on the electrode bodies 12a-c. In an embodiment, the electrical reset current, averaged over the area of the total electrode, may correspond to approximately greater than 0 mA/cm² through 10 mA/cm², and preferably 1-2 mA/cm², for example, when the metal fuel is zinc, and the oxidizer from the reduction reaction with the air at the oxidant electrode 14, or from the reduction reaction with water at the third electrode 70.

Figure 17:
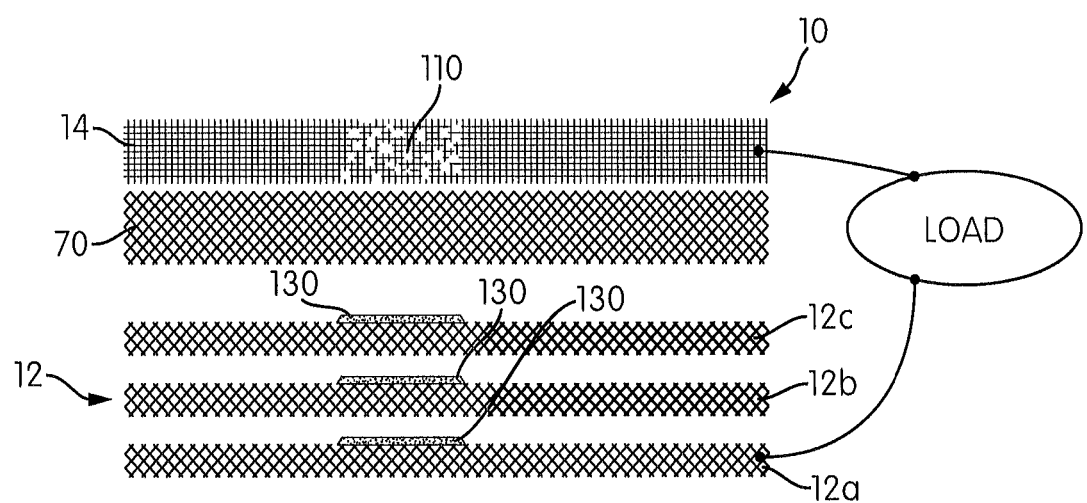
FIG. 17 shows the cell of FIG. 16 in an effectively depleted state.

Depending on the configuration of the cell 10, the electric current may be applied to each, one, some, or all of the electrode bodies 12a-c of the fuel electrode 12. For example, FIG. 17 illustrates the cell 10 having progressed in the discharge mode from the partially discharged condition seen in FIG. 16 to a mostly discharged condition, wherein the areas of under-oxidation 130 are no longer providing sufficient power output to supply the load. Since, as seen, electrode bodies 12b and 12c are no longer electrically connected to electrode body 12a, the resetting process may not be effective in oxidizing the area of under-oxidation 130 on those electrode bodies 12b-c. In an embodiment, to ensure that such a configuration in the cell 10 oxidizes metal fuel on subsequent electrode bodies 12b-c, the resetting process may comprise connecting the fuel electrode bodies of the cell 10 externally, so that electrical connections are formed between the electrode bodies 12a-c, before applying electrical reset current to oxidize the metal fuel. In an embodiment, the cell 10 may comprise selectively closed electrical connections between the electrode bodies 12a-c, so that the areas of under-oxidation 130 may be oxidized on each, some, or all of the electrode bodies 12a-c.

Figure 18:
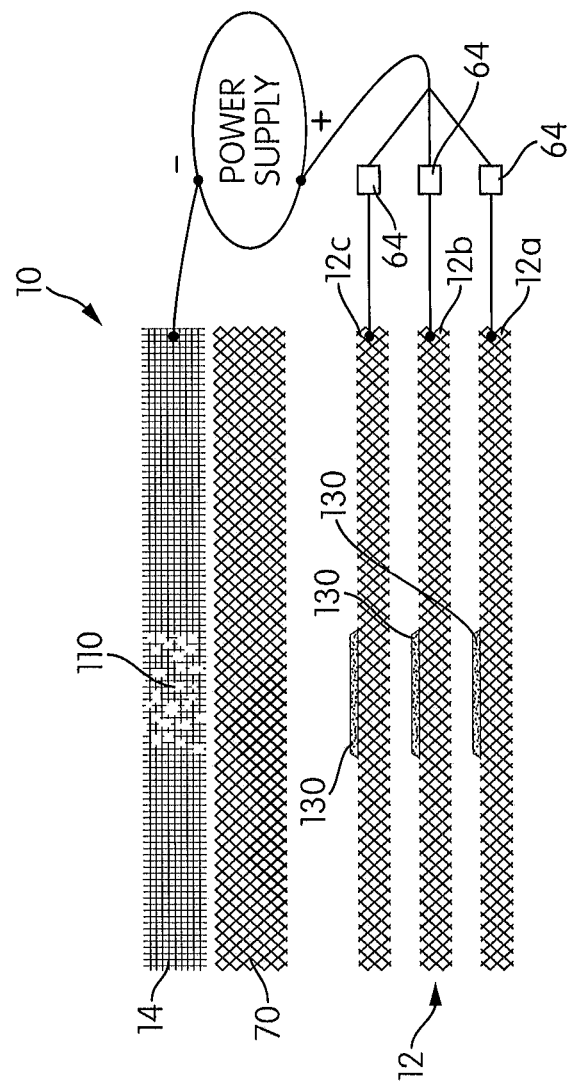
FIG. 18 shows the cell of FIG. 17 configured to be reset.
Figure 19:
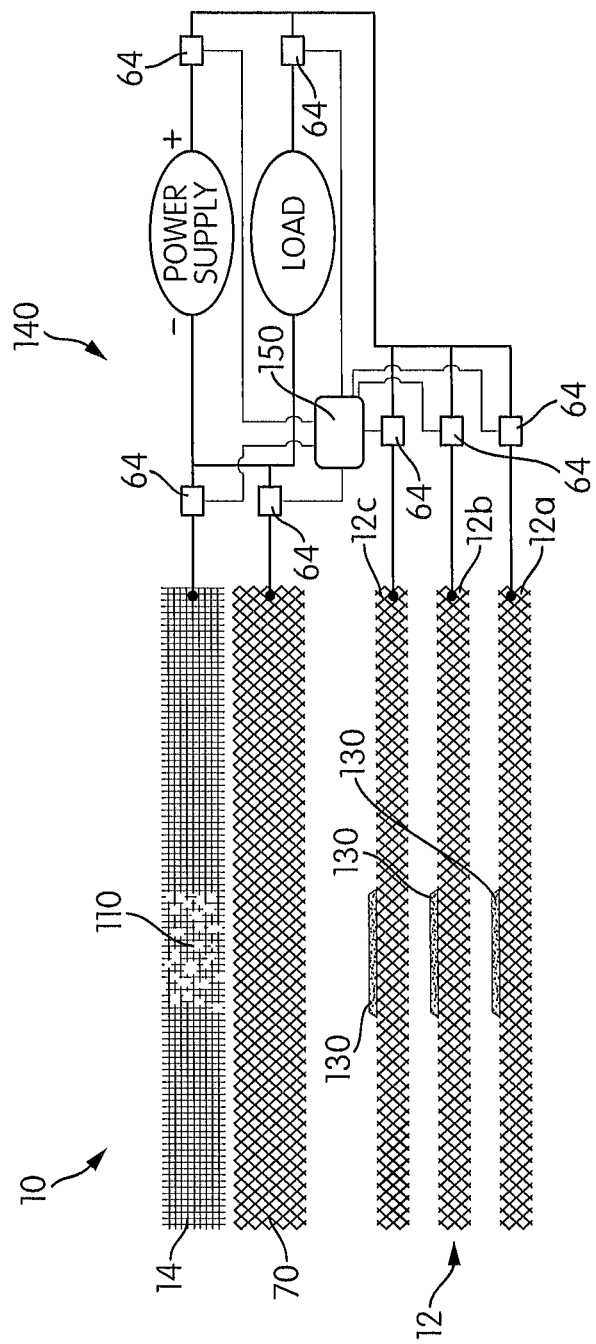
FIG. 19 shows an isolated schematic view of an electrochemical cell system comprising an electrochemical cell similar to that of FIG. 18, further comprising a controller.

As seen in the non-limiting embodiment in FIG. 18, the switches 64 may be utilized to selectively move between an open and a closed electrical connection, permitting or preventing the electrical reset current to be applied to each of the electrode bodies 12a-c. The switches 64 may be of any suitable form. Additionally, as described above, any suitable control mechanism may be provided to control the action of the switches 64 between open and closed positions. For example, as seen in FIG. 19, the electrochemical cell 10 may be part of an electrochemical cell system 140, which may further comprise a controller 150. As discussed in greater detail below, in some embodiments multiple cells 10 may be in the electrochemical system 140. The controller 150 may be of any suitable type or configuration, including but not limited to a processor, a computer, electronic circuitry, and so on. The controller 150 may be configured to have embedded control instructions. In an embodiment, the controller 150 may comprise an input to receive control instructions. In an embodiment, the controller 150 may be configured to selectively control an open state or a closed state of each of the plurality of switches 64 in response to the control instructions. For example, depending on the control instructions, the configuration of the plurality of switches 64 may place the electrochemical cell system 140 in the charging mode, the discharging mode, or the resetting mode. In an embodiment, the controller 150 may also control some of the plurality of switches 64 to control connections to a power input circuit (shown in FIG. 19 as the "Power Supply") and a power output circuit (shown in FIG. 19 as the "Load"). Such a configuration may be useful so that manual disconnection and reconnection of such electrical connections are not necessary when changing the mode of the electrochemical cell system 140.

The processor of the controller 150, which may or may not be comprised within the electrochemical cell system 140, may be configured to implement the resetting process based on any suitable consideration. In an embodiment, the controller 150 may be configured to first determine if the resetting process is needed for the electrochemical cell 10. Such a determination may be based on a number of conditions, including but not limited to the charge capacity of the cell, the passage of a time interval, or the passage of a number of charge and/or discharge cycles. For example, determining if the resetting process is needed may comprise sensing a present charge capacity for the cell, and comparing the present charge capacity to an initial, previous, or threshold charge capacity. If the present charge capacity if less than the initial, previous, or threshold charge capacity by a threshold amount, the controller 150 may be configured to determine that a resetting process is needed, and to implement the process. As another example, determining if the resetting process is needed may comprise determining if a predetermined amount of elapsed time has occurred since the cell 10 was last discharged or last reset. As another example, determining if the resetting process is needed may comprise determining if a predetermined amount of elapsed time has occurred since the cell 10 was last discharged or last reset. In an embodiment, the predetermined amount of time may contain a randomized time interval. As another example, determining if the resetting process is needed may comprise determining if a predetermined number of charges and/or discharges have occurred since the electrochemical cell was initially charged, or last reset. In an embodiment, the predetermined number of charges and/or discharges may be randomized.

Eventually, the resetting process may be determined to be complete, and the electrical reset current may be removed from the fuel cell 10 to discontinue the resetting process. The determination to discontinue the resetting process may be achieved by any suitable means. In embodiments having an electrochemical cell system 140 with a controller 150, the determination to discontinue the resetting process may be made through the controller 150. Such a determination may be made from any suitable consideration. For example, in an embodiment the elapse of an interval of time, such as one known to be sufficient to completely oxidize all but a threshold amount of metal fuel in the cell 10, may be used to determine the completion of the resetting process. In an embodiment, the lack of detection of presence of metal fuel above a threshold value may also be used to signal that the cell 10 has been reset. In an embodiment, a detection of the amount of reducible fuel species in the ionically conductive medium above a threshold value may also be used. In an embodiment, a measurement of charge capacity of the cell 10 may also be used. In one non-limiting example, the measurement of charge capacity may be taken at a set time interval following the commencement of the resetting process, and may be compared to a measurement taken prior to the start of the resetting process, including preferably a measurement taken when the cell 10 is known to be operating with an ideal charge capacity.

Figure 20:
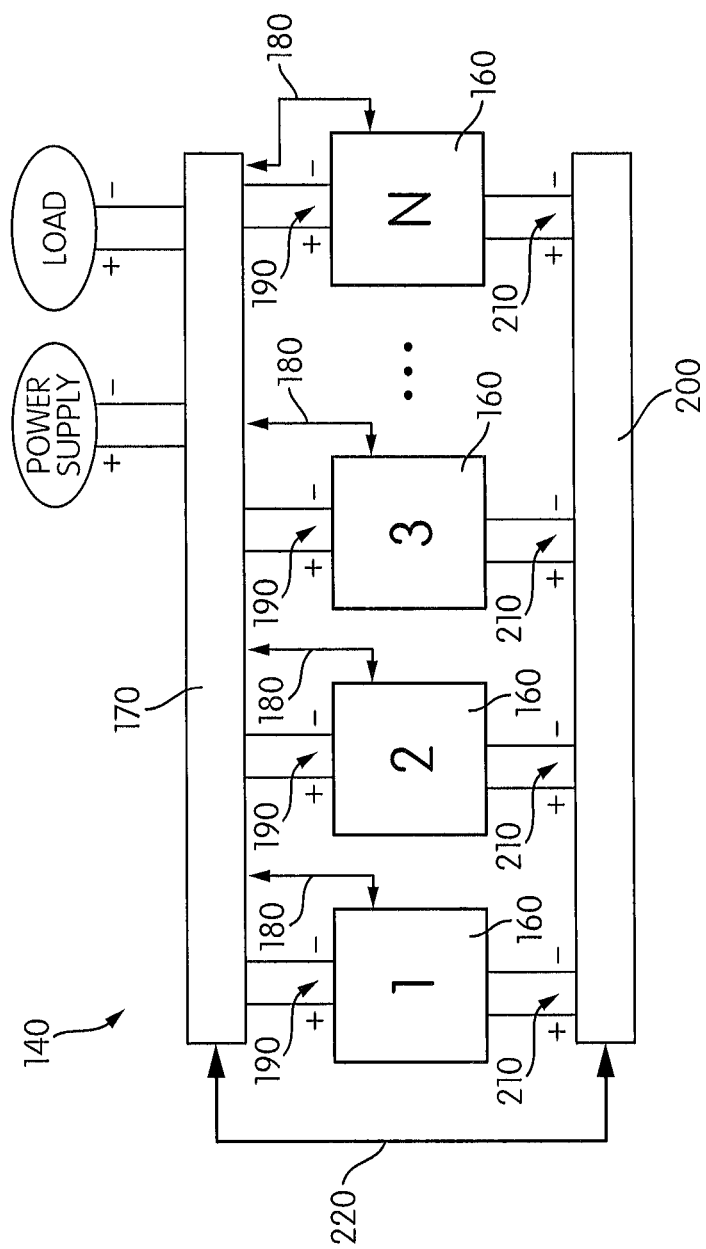
FIG. 20 shows a schematic view of an electrochemical cell system comprising a plurality of modules of the cells connected by a charge/discharge control system and a maintenance subsystem.

As noted above, in some embodiments multiple cells 10 may be assembled into electrochemical cell system 140. As shown in FIG. 20, in an embodiment electrochemical cell system 140 contains N modules 160 that are connected by a charge/discharge control system 170. Each module 160 may contain one or more cells 10. The charge/discharge control system 170 may include connections to and from the power supply (when the cell system 140 is in a charging mode), and the load (when the cell system 140 is in a discharge mode). In an embodiment, the charge/discharge control system 170 may include controller 150 and switches 64 associated with each module 160. In an embodiment each cell 10 may have its own associated switches 64, and may have its own controller 150, that may be controlled by a master controller within the charge/discharge control system 170. In an embodiment, the charge/discharge control system 170 may connect each module 160 with one or more control lines 180, which may communicate with the controller 150 associated with each cell or module, or may communicate directly with the switches 64 for each cell or module. As shown, each module 160 may be electrically connected to the charge/discharge control system 170 through module terminals 190.

As shown in the illustrated embodiment of FIG. 20, electrochemical cell system 140 may further contain a maintenance subsystem 200. In an embodiment, maintenance subsystem 200 may be electrically connected to the modules 160 by maintenance terminals 210. In an embodiment, maintenance subsystem 200 may be connected to the charge/discharge control system 170 by a maintenance bus 220, which may, for example, connect a controller 150 within the maintenance subsystem 200 to a controller within the charge/discharge control system 170. In an embodiment, maintenance subsystem 200 may be connected to controllers 150 or switches 64 within each module 160 directly, or may connect to the controllers 150 or switches 64 within each module 160 through the maintenance bus 220, the charge/discharge control system 170, and the control lines 180. In an embodiment, the maintenance subsystem 200 may contain its own controller 150.

In an embodiment, sensors may be provided in one or more of the cells 10, the modules 160, the charge/discharge control system 170, the maintenance subsystem 200, or any other portion of electrochemical cell system 140. The sensors may be configured to communicate with controllers 150, so as to provide information that may determine how to control switches 64 associated with the modules 160, the charge/discharge control system 170, and/or the maintenance subsystem 200. In an embodiment, sensors may provide information based upon the current, voltage, fuel growth status, charge capacity measurement, or any other indicia of the status or health of cells 10, modules 160 and/or electrochemical cell system 140. In an embodiment, the charge/discharge control system 170 and/or the maintenance subsystem 200 may be configured to selectively isolate one or more of cells 10 within modules 160, or one or more modules 160, so as to perform maintenance on the cells 10 and/or the modules 160. In an embodiment, switches 64 may include one or more bypass switches to isolate the one or more cells 10 and/or the one or more modules 160. In various embodiments, the maintenance subsystem 200 and/or the charge/discharge control system 170 may be configured to isolate one or more cells 10 within each module 160, or isolate one or more modules 160 within the electrochemical cell system 140.

As an example, in the illustrated embodiment, if it were determined that a reset procedure would be desirable on the $2^{nd}$ module 160, such as by measuring a voltage drop or a current spike on the $2^{nd}$ module 160, the charge/discharge control system 170 may electrically disconnect switches 64 associated with module terminals 190 associated with the $2^{nd}$ module 160, so that only the $1^{st}$ and $3^{rd}$ through Nth modules 160 are connected to the power supply 160 during charging or the load during discharging. In an embodiment, the $2^{nd}$ module 160 may then be connected to the maintenance subsystem 200 through maintenance terminals 210. In an embodiment, the reset current may then be provided to the 2" module 160, to force oxidation of any remaining metal fuel on the $2^{nd}$ module 160, including, for example, passivated deposits, or areas of under-oxidation 130. In an embodiment, the reset current may be provided by the power supply, by the maintenance terminals 210, via the charge/discharge control system 170, the maintenance bus 220, and the maintenance subsystem 200. In an embodiment, a separate power supply associated with the maintenance subsystem 200 may provide the reset current. In an embodiment where, for example, the reset current is to be applied to the $2^{nd}$ module 160, the reset current may be drawn or diverted from the current generated by the other modules 160 (i.e. the $1^{st}$ and $3^{rd}$-$N^{th}$ modules 160). In such an embodiment, the reset current provided by the other modules 160 may be provided from maintenance terminals 210 for the other modules 160, through the maintenance subsystem 200, and through the maintenance terminals 210 for the modules 160 to which the reset current is to be applied. In other such embodiments, the reset current may be provided by the other modules 160 from the module terminals 190, through the charge/discharge control system 170, the maintenance bus 220 and the maintenance subsystem 200.

In some embodiments, the electrochemical cell system 140 may contain one or more voltage regulators and/or one or more current regulators. Such voltage or current regulators may be part of each cell 10, each module 160, the charge/discharge control system 170, or the maintenance subsystem 200. In an embodiment the voltage regulator and/or the current regulator may be configured to convert power from the power supply or from the other modules 160 so as to provide the reset current as described above. In an embodiment, the current regulator may be configured such that the reset current is above 0 mA/cm2 through approximately 10 mA/cm2. The direction of the reset current is such that the fuel electrode is oxidized electrochemically. In an embodiment, the voltage regulator may be configured such that the reset current corresponds to a reset voltage (the difference Vc−Va between the Vc of the oxidant electrode 14 and the voltage Va of the fuel electrode 12) of above approximately −1V and below approximately 1V. In an embodiment, the reset current may be applied to the cell 10 and/or the module 160 while the voltage measured across the cell 10 and/or module 160 is below approximately 0.5V/cell. In an embodiment, once the voltage across the cell 10 and/or module 160 falls below −0.5V/cell (or another threshold voltage, depending on the materials), the regulation of the reset current may switch to be based on voltage. Such a switch at the threshold voltage may be useful to keep the voltage so that oxidation of the metal fuel in the cell 10 and/or module 160 remains in the transpassive regime. In some embodiments the reset current may be applied for a set duration of time. In some embodiments, the current supplied by the cell 10 and/or the module 160 may be monitored, and the reset current may be discontinued once the current supplied by the cell 10 and/or the module 160 drops below a threshold amount, indicating that the metal fuel has been consumed.

In some embodiments, the reset process may be preceded by the oxidation of fuel in the cell 10 under controlled voltage or current conditions, such as by using an electronic circuit containing a variable load to remove most of the fuel present on the fuel electrode 12. The voltage or current may be selected such that no passivation of fuel occurs. For example, the cell 10 may be discharged at a fixed potential of approximately 1V. The transition to implementing the reset process may be triggered based on a lower threshold limit for the current, for example approximately 0.2 A flowing through the load. In an embodiment having constant voltage, the discharge voltage may range from approximately 0.7-1.1V (the difference between voltage of the oxidant electrode 14 and the fuel electrode 12), and the current limit for transition to reset process may range from approximately 0.25 mA/cm2 to approximately 5 mA/cm2. In the case of constant current, the discharge current may range from approximately 0.25 mA/cm2 to approximately 5 mA/cm2 and the voltage limit for transition to reset process may range from approximately 0.65V-1.1V. Optionally in an embodiment, all of the fuel electrode bodies 12a-c may be externally connected through a switch, as described earlier.

Where electrodes are referred to herein, it should be understood that various structures in some embodiments may function as one or more electrodes in different ways depending on the operational mode of the device. For example, in some embodiments where the oxidant electrode is bi-functional as a charging electrode, the same electrode structure acts as an oxidant electrode during discharging and as a charging electrode during charging. Similarly, in the embodiment where the charging electrode is a dynamic charging electrode, all of the bodies of the fuel electrode act as the fuel electrode during discharging; but during charging one or more of the bodies act as the fuel electrode by receiving electrodeposited fuel and one or more other of the bodies act as the charging electrode to evolve the oxidant (e.g., oxygen), and the fuel electrode grows as the electrodeposited growth connects to more of the bodies. Thus, reference to an electrode is expressly defined as either a distinct electrode structure or the functional role a structure capable of multiple electrode functions may play during different operational modes of the cell (and thus the same multi-functional structure may be considered to satisfy multiple electrodes for this reason).

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

The subject matter claimed in this application was made under a joint research agreement qualifying under 35 U.S.C. § 103 (c)(2) and (3) to which Fluidic, Inc. and Arizona Science and Technology Enterprises, LLC acting as the exclusive master licensee for Arizona State University are parties.

What is claimed is:

1. A method for managing a plurality of electrochemical cells using a controller, wherein each of the electrochemical cells comprises a fuel electrode comprising a series of permeable electrode bodies arranged in spaced apart relation for receiving electrodeposited metal fuel; an oxidant electrode spaced apart from the fuel electrode; a charging electrode; and an ionically conductive medium communicating the electrodes; the controller comprising logic to implement the method, the method comprising:

determining for each of a plurality of the electrochemical cells whether a maintenance operation is needed for the electrochemical cell, whether to bypass the electrochemical cell, or whether to charge or discharge the electrochemical cell;

controlling charging or discharging each of the plurality of electrochemical cells that are determined to be charged or discharged;

electrically isolating each of the plurality of electrochemical cells for which the maintenance operation is determined to be needed from each cell determined to be charged or discharged;

connecting each cell for which the maintenance operation is determined to be needed to a maintenance subsystem; and performing under control of the maintenance subsystem the maintenance operation on each cell for which the maintenance operation is determined to be needed while electrically isolated from each of the charged or discharged cells.

2. The method of claim 1, wherein the method further comprises determining whether the maintenance operation is needed through sensing one or more measurements associated with each of the plurality of electrochemical cells.

3. The method of claim 2, wherein said sensing comprises sensing one or more of a current, a voltage, a fuel growth status, and a charge capacity measurement.

4. The method of claim 1, wherein each of the plurality of electrochemical cells are distributed into a plurality of modules comprising one or more electrochemical cells, and wherein said determining is for the plurality of electrochemical cells in each module.

5. The method of claim 1, wherein the method further comprises determining whether maintenance operation is needed by determining if a predetermined amount of elapsed time has occurred since the electrochemical cell was last discharged, or since the electrochemical cell was last maintained.

6. The method of claim 1, wherein the maintenance operation is a resetting process.

7. The method of claim 6, wherein an electrical reset current is applied from a power source between the fuel electrode and at least one other electrode, with the fuel electrode functioning as an anode and the other electrode functioning as a cathode, such that the metal fuel on the fuel electrode is oxidized into a reducible fuel species.

8. The method of claim 7, wherein the power source comprises an external power source to the electrochemical cell system.

9. The method of claim 7, wherein the power source comprises one or more of the plurality of electrochemical cells.

10. The method of claim 6, wherein said charging or discharging, said electrically isolating each electrochemical cell, or said resetting process comprises controlling an open state or a closed state of each of a plurality of switches associated with the electrochemical cell.

* * * * *